US012731027B2

(12) United States Patent
Retinraj et al.

(10) Patent No.: US 12,731,027 B2
(45) Date of Patent: Sep. 8, 2026

(54) MACHINE-LEARNING MODEL FOR INTELLIGENT RULE GENERATION

(71) Applicant: Oracle International Corporation, Redwood Shores, CA (US)

(72) Inventors: Paul Deepakraj Retinraj, Mountain House, CA (US); Rajan Madhavan, Foster City, CA (US); Sandeep Datar, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 884 days.

(21) Appl. No.: 17/984,404

(22) Filed: Nov. 10, 2022

(65) Prior Publication Data

US 2024/0160912 A1 May 16, 2024

(51) Int. Cl.

| | |
|---|---|
| ***G06N 3/08*** | (2023.01) |
| ***G06F 3/04847*** | (2022.01) |
| ***G06F 16/242*** | (2019.01) |
| ***G06F 16/2452*** | (2019.01) |
| ***G06F 40/186*** | (2020.01) |
| ***G06F 40/284*** | (2020.01) |

(52) U.S. Cl.

CPC ........... *G06N 3/08* (2013.01); *G06F 3/04847* (2013.01); *G06F 16/242* (2019.01); *G06F 16/2452* (2019.01); *G06F 40/186* (2020.01); *G06F 40/284* (2020.01)

(58) Field of Classification Search

CPC ....... G06N 3/08; G06F 40/284; G06F 40/186; G06F 3/04847

See application file for complete search history.

(56) References Cited

U.S. PATENT DOCUMENTS

| | | | | |
|---|---|---|---|---|
| 8,645,405 | B2 | 2/2014 | Chang et al. | |
| 11,068,480 | B2 | 7/2021 | Bhatt et al. | |
| 12,159,224 | B2 * | 12/2024 | Lei | G06N 3/08 |
| 2014/0236579 | A1 * | 8/2014 | Kurz | G06F 40/284 704/9 |
| 2017/0083569 | A1 | 3/2017 | Boguraev et al. | |
| 2018/0365212 | A1 * | 12/2018 | Banerjee | H04L 51/02 |

(Continued)

FOREIGN PATENT DOCUMENTS

CN 112487135 A 3/2021

OTHER PUBLICATIONS

Chandarana, Dhairya, et al. "Natural language sentence to SQL query converter." International Journal of Engineering Research & Technology (IJERT) 9.3 (2021): 467-472 (Year: 2021).*

(Continued)

*Primary Examiner* — Shahid K Khan

(74) *Attorney, Agent, or Firm* — Invoke

(57) ABSTRACT

The present disclosure relates to systems and methods for automatic rule generation based on natural language input. Natural language input can be received. The natural language input can be tokenized. First tokens can be mapped to a first condition of a rule, and second tokens can be mapped to a second condition of the rule. A graph representation of the natural language input can be generated. A pre-generated, tenant-specific graph can be selected that corresponds to the graph representation of the natural language input. A rule can be generated based on the tenant-specific graph. The rule can be provided to facilitate implementation of the rule.

23 Claims, 11 Drawing Sheets

(56) References Cited

U.S. PATENT DOCUMENTS

| | | | | |
|---|---|---|---|---|
| 2020/0004388 | A1 * | 1/2020 | Myhre | H04M 1/72451 |
| 2020/0210524 | A1 | 7/2020 | Yang et al. | |
| 2020/0334252 | A1 | 10/2020 | Lee | |
| 2021/0109969 | A1 * | 4/2021 | Oliveira Almeida | G06F 16/906 |
| 2022/0188661 | A1 * | 6/2022 | Tappin | G06F 16/248 |

OTHER PUBLICATIONS

Chandaran, D. et al., "Natural Language Sentence to SQL Query Converter", International Journal of Engineering Research & Technology (IJERT), ISSN: 2278-0181, NTASU—2029 Conference Proceedings, Special Issue 2021, 6 pages.

Kim, Aerin, "[Text-to-SQL] Learning to query tables with natural language", https://towardsdatascience.com/text-to-sql-learning-to-query-tables-with-natural-language-7d714e60a70d, Jun. 5, 2020, 13 pages.

Liang, S. et al., "Querying knowledge graphs in natural language", Journal of Big Data, (2021) 8:3, 23 pages.

nlsql.com, "Using Natural Language Text to Query Databases with SQL", https://www.nlsql.com/blog/post/natural-language-text-sql-query-data-analytics/, 1 page.

Pagrut, A. et al., "Automated SQL Query Generator by Understanding a Natural Language Statement", International Journal on Natural Language Computing (IJNLC), vol. 7, No. 3, Jun. 2018, 11 pages.

Paira et al., "SQL_NL—A Parser that Converts SQL Query to Natural Language", ICTACT Journal on Soft Computing, Oct. 2019, vol. 10, No. 1, pp. 1999-2003.

Patatunda, J., "Transforming Natural Language Text to SQL", Indellient, https://www.indellient.com/blog/transforming-natural-language-text-to-sql, 8 pages.

* cited by examiner

MACHINE-LEARNING MODEL FOR INTELLIGENT RULE GENERATION

TECHNICAL FIELD

The present disclosure relates to systems and methods for intelligently generating rules using machine-learning techniques. More particularly, the present disclosure relates to systems and methods that generate, using a trained machine-learning model, one or more rules in response to receiving natural language input.

BACKGROUND

Various types of rules can be generated using a computing device. The rules can include queries, storage instructions, notification rules, and the like. Generating the rules can involve an entity, such as an engineer or other suitable individual, manually writing the rules, generating the rules from existing knowledge of functions and syntax of a rule-based language (e.g., SQL), and the like. In some scenarios, however, entities without knowledge of the rule-based language may be tasked with generating the rules. The entities may experience significant delays in generating the rules due to their lack of skill, experience, and the like with respect to the rule-based language. Additionally, the entities risk making mistakes at a significant rate when generating the rules.

SUMMARY

In some embodiments, a computer-implemented method is provided for automatically generating a rule in response to receiving natural language input. Natural language input representing a request by an entity can be received by a computing device to create a rule characterized by a rule type. The rule type can include one or more conditions and one or more actions based on the one or more conditions. In some embodiments, a condition includes a statement or circumstance that, when evaluated by a computing device and determined to be satisfied, triggers the computing device to execute the action. In a particular example, a condition can include the statement "if the sender of an email is John Doe," and the action can include the statement "delete the email." If the condition statement is satisfied (e.g., an incoming email is from the sender John Doe), then the action is executed by the computing device (e.g., the computing device deletes the incoming email without additional user input).

The natural language input can be tokenized to generate a set of tokens that represents the natural language input. A first subset of the tokens can be mapped, using a trained graph-based machine-learning model, to a first condition of the one or more conditions. For example, the first subset of the tokens may include one or more tokens corresponding to a first characteristic type of an entity, such as a user, a group of users, an organization, or the like, such that the first characteristic type of the entity may be used to evaluate the first condition. The first characteristic type may include characteristics such as a type of entity, a number of entities, and the like. Values of tokens of the first subset of tokens can include nouns that correspond to the first condition. The one or more nouns may include "men," "users," "organizations," or other components of natural language input that may indicate the first condition. In some embodiments, the tokens of the first subset of the tokens can be used, for example by the computing device, to evaluate whether the first condition is satisfied. The first condition may be or include at least a partial statement. For example, the first condition may include the partial statement: "Find users that reside in . . . ," which may indicate that the rule type is a query that is intended to search for users residing in a particular location.

Additionally, a second subset of the tokens can be mapped, using the trained graph-based machine-learning model, to a second condition of the one or more conditions. For example, the second subset of the tokens may include one or more tokens corresponding to a second characteristic type of the entity such that the second characteristic type of the entity may be used to evaluate the second condition. The second characteristic type can include characteristics such as a location of one or more entities, an age of one or more entities, an education level of one or more entities, and the like. Values of tokens of the second subset of tokens can include strings, numbers, words, or phrases that correspond to the second condition. The second subset of the tokens may include "San Francisco," "New York," "Chicago," or other suitable strings, numbers words, or phrases that may indicate the second condition. In some embodiments, the tokens of the second subset of the tokens can be used, for example by the computing device, to evaluate whether the second condition is satisfied. The second condition may be or include at least a partial statement. For example, the second condition may include the partial statement: " . . . San Francisco, New York, or Chicago," which may indicate that the rule type is the query that is intended to search for users residing in one of a set of cities. Combined, the first condition and the second condition may form the rule, or a natural language format of the rule. For example, a combination of the first condition and the second condition, as previously described, may be "Find users that reside in San Francisco, New York, or Chicago," which may be or include the natural language input.

A graph representation of the natural language input can be generated by the computing device. The graph representation can include one or more nodes. Each node of the one or more nodes may correspond to a different particular entity represented by a different token of the first subset of the tokens. Additionally, each node may be associated with one or more attributes that may be indicated by the second subset of the tokens. In some embodiments, a node can be defined by the first characteristic type of a corresponding token of the first subset of the tokens, and the corresponding token can represent a particular entity. Additionally, an attribute may be defined by the second characteristic type of a corresponding token of the second subset of the tokens, and the corresponding token can represent traits (e.g., location, age, education, etc.) of the particular entity represented by the node with which the attribute is associated. In some embodiments, the attribute can be connected to, for example in a directed acyclic graph or other tree structure, the node, and in other embodiments, the node may be represented by a bucket structure that can contain the attribute and other attributes for the particular entity. In a particular example, the graph representation includes one node corresponding to the first condition of "men," and four attributes, each connected to the node, that correspond to "location," "age," "assets," and "educational level."

A particular tenant-specific graph of a set of tenant-specific graphs can be selected by the computing device. The particular tenant-specific graph may be a graph pre-generated by the graph-based machine-learning model and may include one or more nodes and a set of attributes such that different subsets of the set of attributes correspond to a different node of the one or more nodes. The particular tenant-specific graph can be pre-generated by the graph-based machine-learning model using a particular custom schema corresponding to a particular tenant. The particular custom schema may include a set of natural language terms that can be used to generate various rules each corresponding to a different rule type or different set of conditions. In some embodiments, the particular custom schema includes a set of historical natural language requests for generating a rule. For example, the graph-based machine-learning model can tokenize the natural language terms included in each historical natural language requests and can, as discussed above, map a first subset of tokens of each historical natural language request to a corresponding first condition and map a second subset of the tokens of each historical natural language request to a corresponding second condition. The graph-based machine-learning model can use the mapped tokens to generate the nodes and attributes of the particular tenant-specific graph. For example, the graph-based machine-learning model can generate a set of nodes, each corresponding to a different token of the first subset of the tokens from the historical natural language input, and the graph-based machine-learning model can generate a set of attributes, each corresponding to a different token of the second subset of the tokens from the historical natural language input.

The one or more nodes and the set of attributes of the particular tenant-specific graph may be based on terms included in a custom schema corresponding to a particular tenant associated with the particular tenant-specific graph. For example, a first particular tenant (e.g., tenant A) may be associated with custom schema A that includes a first term (e.g., "entity") for a user. Thus, the particular tenant-specific graph may include a node corresponding to "entity," while a different tenant-specific graph may include a node corresponding to "user," that indicates the user, based on a different custom schema.

The set of tenant-specific graphs can be pre-generated by the trained graph-based machine-learning model, and the particular tenant-specific graph can correspond to the graph representation of the natural language input. In some examples, the computing device computes a similarity score, a distance, or other type of similarity measurement between the graph representation and each tenant-specific graph of the set of tenant-specific graphs to determine which tenant-specific graph to select based on the graph representation. The rule can be generated by the computing device by adjusting a template of the rule type using nodes and/or attributes of the particular tenant-specific graph. The node may be a representation of a first condition in the particular tenant-specific graph, and the attributes may be representations of one or more second conditions in the particular tenant-specific graph. In a particular example, the node of the particular tenant-specific graph is "women," and the attributes of the particular tenant-specific graph are "between 18-35 years old," and "without a college degree." Accordingly, a rule template can be adjusted by inserting conditions and/or actions based on "women" and "without a college degree" into respective portions of the rule template. The rule can be provided by the computing device to the entity to facilitate implementation of the rule.

In some embodiments, the trained graph-based machine-learning model can include a graph neural network-BERT (GNN-BERT) model, a graph convolutional network (GCN), a gated-graph convolutional network (G-GCN), or a graph isomorphism network (GIN). The computer-implemented method can include training, by the computing device, the graph-based machine-learning model using a first set of data and a second set of data. The first set of data can include a set of custom schema corresponding to tenant-specific data, and each custom schema included in the set of custom schema can be different and can be associated with a different tenant. The second set of data can include tenant-ambiguous data.

In some embodiments, each tenant-specific graph of the set of tenant-specific graphs can correspond to a different custom schema of the set of custom schema, and the particular tenant-specific graph can be included in the set of tenant-specific graphs.

In some embodiments, receiving the natural language input can include receiving, by the computing device, the natural language input via a user interface provided by a user interface layer that is communicatively coupled to an application programming interface layer. Generating the rule can include generating, by the computing device, the rule using a machine-learning layer that is communicatively coupled to the application programming interface layer. The application programming interface layer can be configured to transmit the natural language input from the user interface layer to the machine-learning layer and to transmit the rule from the machine-learning layer to the user interface layer. Training the graph-based machine-learning model can include training, by the computing device, the graph-based machine-learning model using a pre-training layer that is communicatively coupled to the machine-learning layer. The pre-training layer can be configured to provide the machine-learning layer with access to each pre-generated graph of the set of tenant-specific graphs.

In some embodiments, providing the rule to the entity can include providing, by the computing device and via a user interface, the rule in an entity-readable format with one or more adjustable fields that facilitate manual editing of the rule.

In some embodiments, the computer-implemented method can additionally include (i) receiving, by the computing device and via the user interface, input indicating an adjustment to the rule, and (ii) retraining, by the computing device, the trained graph-based machine-learning model using the adjustment to the rule.

In some embodiments, retraining the trained graph-based machine-learning model can include (i) identifying, by the computing device, the adjustment to the rule by comparing the rule to an adjusted rule received by the computing device, (ii) generating, by the computing device, a tokenized adjustment based on the adjustment to the rule, and (iii) retraining, by the computing device and using the tokenized adjustment, the trained graph-based machine-learning model.

In some embodiments, a computer-program product is provided that is tangibly embodied in a non-transitory machine-readable storage medium and that includes instructions configured to cause one or more data processors to perform various operation. The operations can include receiving natural language input representing a request by an entity to create a rule characterized by a rule type. The rule type can include one or more conditions and one or more actions based on the one or more conditions. The operations can include tokenizing the natural language input to generate a set of tokens that represents the natural language input. The operations can include mapping, using a trained graph-based machine-learning model, a first subset of the tokens to a first condition of the one or more conditions and a second subset of the tokens to a second condition of the one or more conditions. The operations can include generating a graph representation of the natural language input. The graph representation can include one or more nodes corresponding to the first subset of the tokens and one or more attributes, and each attribute of the one or more attributes can include a different token of the second subset of the tokens. The operations can include selecting a particular tenant-specific graph of a set of tenant-specific graphs. The set of tenant-specific graphs can be pre-generated by the trained graph-based machine-learning model, and the particular tenant-specific graph can correspond to the graph representation of the natural language input. The operations can include generating the rule by adjusting a template of the rule type using nodes of the particular tenant-specific graph and attributes of the particular tenant-specific graph. The operations can include providing the rule to the entity to facilitate implementation of the rule.

In some embodiments, a system is provided that includes one or more data processors and a non-transitory computer readable storage medium including instructions which, when executed on the one or more data processors, cause the one or more data processors to perform various operations. The system can receive natural language input representing a request by an entity to create a rule characterized by a rule type. The rule type can include one or more conditions and one or more actions based on the one or more conditions. The system can tokenize the natural language input to generate a set of tokens that represents the natural language input. The system can map, using a trained graph-based machine-learning model, a first subset of the tokens to a first condition of the one or more conditions and a second subset of the tokens to a second condition of the one or more conditions. The system can generate a graph representation of the natural language input. The graph representation can include one or more nodes corresponding to the first subset of the tokens and one or more attributes. Each attribute of the one or more attributes can include a different token of the second subset of the tokens. The system can select a particular tenant-specific graph of a set of tenant-specific graphs. The set of tenant-specific graphs can be pre-generated by the trained graph-based machine-learning model, and the particular tenant-specific graph can correspond to the graph representation of the natural language input. The system can generate the rule by adjusting a template of the rule type using nodes of the particular tenant-specific graph and attributes of the particular tenant-specific graph. The system can provide the rule to the entity to facilitate implementation of the rule.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification and variation of the concepts herein disclosed may be resorted to by those skilled in the art, and that such modifications and variations are considered to be within the scope of this invention as defined by the appended claims.

BRIEF DESCRIPTION OF THE DRAWINGS

The specification makes reference to the following appended figures, in which use of like reference numerals in different figures is intended to illustrate like or analogous components.

DETAILED DESCRIPTION

Figure 1:
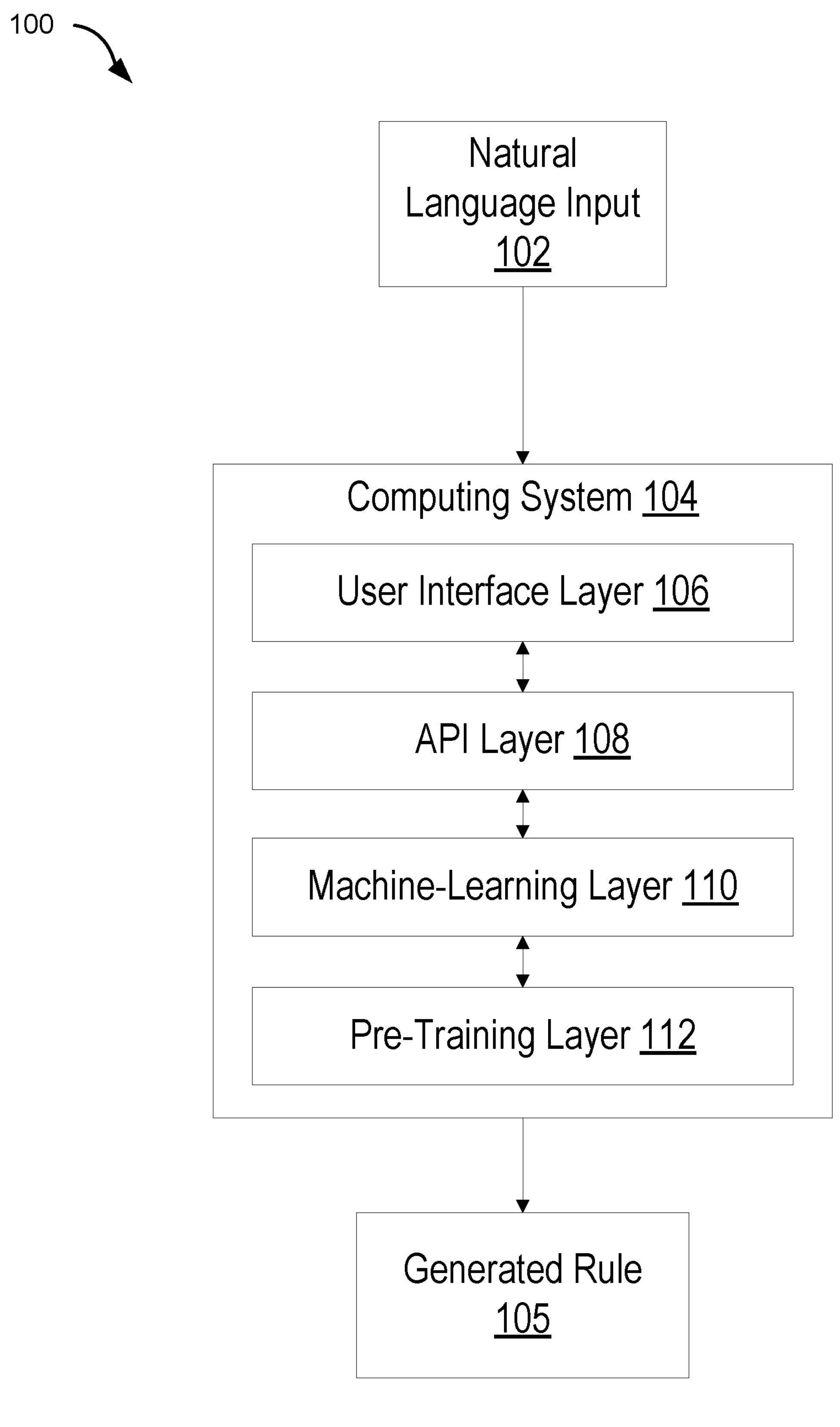
FIG. 1 is a block diagram illustrating an example of a data processing environment for generating a rule using natural language input according to an embodiment.

In the following description, for the purposes of explanation, specific details are set forth in order to provide a thorough understanding of certain embodiments. However, it will be apparent that various embodiments may be practiced without these specific details. The figures and description are not intended to be restrictive. The word "example" is used herein to mean "serving as an example, instance, or illustration." Any embodiment or design described herein as an "example" is not necessarily to be construed as preferred or advantageous over other embodiments or designs.

Overview

Certain aspects and features of the present disclosure relate to automatically generating a rule based on natural language input. The rule may be generated for querying a database, for causing a computing device to store or arrange data in a particular manner, or for otherwise causing the computing device to execute an action based on a condition. In one particular example, the rule includes conditional instructions. The natural language input may include input provided by an entity to a computing system via a typed characters on a keyboard, audio input (e.g., spoken words), physical gestures, or other types of natural language input. The rule may include any type of conditional instructions such as a structured query language (SQL) rule such as a query, an email rule such as instructions for arranging communications, a storage rule for accessing and/or storing information on the computing device, and the like. In some examples, the rule includes a non-conditional instruction additionally or alternatively to the conditional instruction.

In some embodiments, a computing device receives the natural language input, which represents a request generated by an entity. Executing the request can cause the computing device to generate a rule that is characterized by a rule type, which can include a condition, an action based on the condition, or a combination or multiple thereof. For example, the rule includes an "if" statement and a "then" statement where the "if" statement is the condition, and the "then" statement is the action. The natural language input can be tokenized by the computing device to generate tokens that represent the natural language input. For example, the computing device generates a token for each word, each word type, each character, each syllable, or any combination of these. The computing device can map the tokens using a trained graph-based machine-learning model such as a graph neural network BERT (GNN-BERT) or other similar trained, graph-based machine-learning models. Mapping the tokens involves mapping a first subset of the tokens to a first condition and a second subset of the tokens to a second condition, which may be different than the first condition. For example, the first subset of tokens represents a word included in the natural language input that indicates the first condition, and the second subset of tokens represents one or more words included in the natural language input that indicate the second condition. In some embodiments, the tokens, or any subset thereof, are mapped to one or more condition-action pairs.

The computing device can use the mapped tokens of the natural language input to generate a graph representation of the natural language input. For example, the graph representation includes one or more nodes and one or more attributes. The nodes can be generated by the computing device based on the first subset of tokens, and the attributes can be generated by the computing device based on the second subset of tokens. The nodes can include one or more characteristics that can be determined based on the first subset of tokens. For example, the node can correspond to a real-world person (or set of people), and the first subset of tokens can indicate that the real-world person is implicated in the natural language input. In a particular example, the first subset of tokens include "users," and "men," which indicates that the requested rule involves real-world people that are users (e.g., of a particular service) and that are men. The computing device can determine that the first subset of tokens implies the real-world person or persons, and the computing device can generate the nodes based on the first subset of tokens.

Additionally, each attribute can include or otherwise correspond to one or more tokens of the second subset of tokens. The attributes can include one or more characteristics that can be determined based on the second subset of tokens. For example, the attributes can correspond to attributes about a real-world person or persons, and the second subset of tokens can indicate that the attributes of the real-world person or persons are implicated in the natural language input. In a particular example, the second subset of tokens include "that live alone," and "aged 18-35," which indicates that the requested rule involves entities that live alone and that are aged 18-35. The computing device can determine that the second subset of tokens implies the attributes of the real-world person or persons, and the computing device can generate the attributes based on the second subset of tokens.

In one particular example, the graph representation includes one node corresponding to a token of the first subset of tokens that corresponds to an entity, and the graph representation additionally includes three attributes each corresponding to the node. The three attributes in this example can include an age attribute, a location attribute, and an education attribute that correspond to the entity. The graph representation can include other numbers (e.g., more than one) of nodes and/or other numbers (e.g., less than three or more than three) of attributes corresponding to one or more of the nodes. In some embodiments, the attributes can be included in the one or more nodes, can be separate and connected to the one or more nodes, or a combination thereof.

The computing device can select or otherwise identify a particular tenant-specific graph, such as a knowledge graph, that corresponds to the graph representation of the natural language input. In some embodiments, the particular tenant-specific graph is included in a set of tenant-specific graphs or knowledge graphs that are pre-generated. Each tenant-specific graph of the set of tenant-specific graphs can correspond to a different tenant such as a data tenant or other similar client serviced by the computing device. The pre-generated tenant-specific graphs can be pre-generated by the computing device using tenant-specific training datasets, machine-learning techniques involving the trained, graph-based machine-learning model, and the like. Additionally, the pre-generated tenant-specific graphs may each include a set of nodes and a set of attributes corresponding to the set of nodes. In some embodiments, the selected tenant-specific graph corresponds most closely to the graph representation of the natural language input. For example, the computing device can compare the graph representation to each tenant-specific graph of the set of tenant-specific graphs to determine similarity scores between the graph representation and each tenant-specific graph, and the computing device can select the particular tenant-specific graph that has the highest similarity score, etc.

In some embodiments, one or more of the tenant-specific graphs can be generated and/or maintained by the computing device via the graph-based machine-learning model such as a graph neural network (GNN). The computing device can use the GNN to update the nodes of the one or more tenant-specific graphs via one or more machine-learning techniques. In a particular example, the GNN may include a set of permutation equivariant layers that can map an initial representation of a particular tenant-specific graph to an updated representation of the particular tenant-specific graph. The GNN may include other suitable layers, such as local pooling layers, global pooling layers, message passing layers (which may be incorporated in the permutation equivariant layers), and the like for generating and/or maintaining the particular tenant-specific graph. Training the particular tenant-specific graph can involve inputting, into the GNN, (i) the initial version of the particular tenant-specific graph and (ii) updated terms, corresponding to nodes of the particular tenant-specific graph, from a training corpus specific to the tenant associated with the particular tenant-specific graph. The GNN can transform the particular tenant-specific graph from the initial representation to the updated representation based on the inputs.

A rule can be generated by the computing device using the nodes of the particular tenant-specific graph and a template of the rule type. For example, the computing device identifies, based on the selected tenant-specific graph, the rule type and generates or accesses the template, which may include proper syntax, format, and the like for the rule type. The computing device adjusts the template of the rule type by applying the nodes and/or attributes of the graph representation and/or the selected particular tenant-specific graph to generate the rule. In some embodiments, adjusting the template includes replacing placeholders or generic terms included in the template with one or more nodes from the selected particular tenant-specific graph and/or the graph representation. The computing device can provide the rule, for example to the entity that requested the rule, to facilitate implementation of the rule. In some embodiments, the computing device generates a user interface with the generated rule and facilitates adjustments to the generated rule to optimize implementation of the rule.

In some embodiments, a computing device that can be used to automatically generate a rule based on natural language input includes various layers. The layers can include a user interface layer, an application programming interface (API) layer, a machine-learning layer, a training layer, and any other layers for generating the rule based on the natural language input. The user interface layer can be configured (i) to receive a request in natural language input to generate the rule, (ii) to provide a rule generated by the computing device and based on the natural language input, and (iii) to receive input for adjusting the generated rule. The API layer can be configured (i) to perform security evaluations between any combination of layers in the computing device and (ii) to make internal and/or external API calls to transfer data (e.g., the request, the natural language input, the graph representation, the set of tenant-specific graphs, the generated rule, etc.) within or otherwise with respect to the computing device. The machine-learning layer can include or otherwise execute a trained, graph-based machine-learning model to generate the rule automatically and based on the natural language input. Additionally, the machine-learning layer is configured (i) to generate the graph representation of the natural language input, (ii) to select the particular tenant-specific graph, and (iii) to generate the set of tenant-specific graphs. The training layer can be configured to train the machine-learning layer and/or any machine-learning models thereof. For example, the training layer trains the graph-based machine-learning model on tenant-generic datasets and/or tenant-specific training datasets to cause the graph-based machine-learning model to be able to generate the graph representation and/or the set of tenant-specific graphs.

In a particular example, a computing device can receive natural language input that includes nouns and verbs indicating a request to generate a query rule in SQL. In some embodiments, the query rule may include a nested query, a subquery, or other suitable rule in SQL. The computing device tokenizes the nouns and verbs and tags the tokens as nouns or verbs, respectively. The computing device maps the tokenized nouns and verbs to tables and columns, respectively. Based on the mappings, the computing device generates one or more clauses such as a “WHERE” clause, a “FROM” clause, a “HAVING” clause, a “SELECT” clause, an “ANY” clause, a nested clause, such as a “SELECT” clause within an “ANY” clause, and the like. In one example, the mappings may indicate that the rule to be generated involves a subquery of two nested “SELECT” clauses, for example, selecting men selected based on age between 18-35, and the computing device can generate the subquery based on the mappings. In other examples, the computing device can generate or add a nested query to the query with the generated clause. The computing device generates a graph representation of the natural language input using the mapped tables (e.g., as nodes of the graph representation) and the mapped columns (e.g., as attributes associated with the nodes of the graph representation). The computing device compares the graph representation to a selected, particular tenant-specific graph and generates the requested SQL query rule based on the comparison.

Generating the rule based on natural language input can improve at least the technical field of computer rule generation. For example, by automatically generating the rule based on natural language input, a particular rule can be generated in less time and with fewer mistakes. Automatically generating the rule removes any need for an entity to learn the various syntax and/or formatting rules for any rule-based languages such as SQL. So, the entity may not spend time gaining experience in generating the rules. Additionally, automatically generating the rule reduces or eliminates mistakes in rule generation by the entity. For example, and particularly with an entity inexperienced with respect to a relevant rule-based language, the entity may make mistakes generating a rule, and additionally, computing resources, such as computational memory, computational processing power, and the like are excessively used. Thus, automatically generating the rule improves an accuracy of the generated rule compared to the entity-generated rule, and automatically generating the rule reduces computational resource usage compared to the entity-generated rule by removing the risk or potential for mistakes.

Example of an Environment for Generating a Rule from Natural Language Input

FIG. 1 is a block diagram illustrating an example of a data processing environment 100 for generating a rule using natural language input according to an embodiment. As illustrated, the data processing environment 100 includes natural language input 102, a computing system 104, and a generated rule 105. The natural language input 102 may be provided by an entity in English, Spanish, French, Arabic, or any other suitable language, and the natural language input 102 can be input into the computing system 104. For example, the entity may type the natural language input on a computer keyboard, speak the natural language input into a computer microphone, make gestures that can be received by a computer camera and that indicate the natural language input, or the like. The natural language input 102 includes a request to generate at least one rule that may be characterized by a rule type that includes a condition and an action executable by a computer based on the condition.

The computing system 104 receives the natural language input 102 from the entity, for example via a user device such as a personal computer, a mobile phone, a tablet computer, or the like. In some embodiments, the computing system 104 provides a user interface via a user interface layer 106. The user interface layer 106 can generate the user interface and provide the user interface to the user device for receiving the natural language input 102. Additionally, the user interface layer 106 is communicatively coupled to at least an API layer 108 and can transmit the natural language input 102 to the API layer 108. Additionally, the user interface layer 106 can receive other information relating to the entity such as authentication information, demographic information, and the like to facilitate any operations that can be subsequently performed by the computing system 104 or any subset or subcomponent thereof. The user interface layer 106 can include various views or subpages, controllers or interactive features, models, and the like to allow the entity to provide the natural language input 102.

The computing system 104 can additionally include the API layer 108 that is communicatively coupled to at least the user interface layer 106 and a machine-learning layer 110. The API layer 108 is configured to make various API calls, for example within the computing system 104 and/or external with respect to the computing system 104. For example, the API layer 108 can execute or receive a first API call to the user interface layer 106 to receive the natural language input 102, the additional information about the entity, etc. from the user interface layer 106 or to transmit the generated rule 105 and the like to the user interface layer 106. In some embodiments, the API layer 108 is configured to perform authentication tasks based on the authentication information received from the entity, to perform some natural language processing tasks, to perform manual overrides based on the natural language input 102, the generated rule 105, or the like, and other operations to facilitate data transfer between the user interface layer 106, the machine-learning layer 110, or other components within or external with respect to the computing system 104.

The computing system 104 can include the machine-learning layer 110, which may be include a machine-learning model, may be configured to execute a machine-learning model, or a combination thereof. In some embodiments, the machine-learning layer 110 includes a pre-trained, graph-based machine-learning model. Some examples of the pre-trained, graph-based machine-learning model include a BERT-GNN, a graph convolutional network (GCN), a gated-graph convolutional network (G-GCN), a graph isomorphism network (GIN), etc. The pre-trained, graph-based machine-learning model can be configured to receive the natural language input 102 and output the generated rule 105 based on the natural language input 102. Additionally, the machine-learning layer 110 can generate an entity-readable rule, which may include the generated rule 105 in a format that can be understood by the entity and that may be characterized by syntax, format, and the like different than that of the generated rule 105. For example, the entity-readable rule can include the generated rule 105 converted to natural language. The machine-learning layer 110 is communicatively coupled to at least the API layer 108 and a training layer 112 included in the computing system 104, and the machine-learning layer 110 is configured to transmit the generated rule 105, the natural language version of the generated rule 105, and any other related outputs to the API layer 108 for transmitting the outputs to the user interface layer 106.

The machine-learning layer 110 may output the generated rule 105 via the user interface layer 106, for example at least indirectly through the API layer 108, and the user interface layer 106 can provide a user interface to the user device for presenting the generated rule 105 to the entity. In some embodiments, the user interface provided to the user device includes at least one interactive feature that allows the entity to adjust the generated rule 105, for example to optimize implementation of the generated rule 105. The machine-learning layer 110 may otherwise output the generated rule 105 to provide the generated rule 105 to the entity to facilitate implementation of the generated rule 105, or any adjusted configuration thereof.

The machine-learning layer 110, or any graph-based machine-learning model thereof, can be trained by the training layer 112 included in the computing system 104. The training layer 112 is communicatively coupled at least to the machine-learning layer 110 and can be communicatively coupled to any other component within or external with respect to the computing system 104. The training layer 112 is configured to train the machine-learning layer 110 or any graph-based machine-learning model thereof using a tenant-generic training dataset, one or more tenant-specific training datasets, or a combination thereof. The tenant-generic training dataset can include data and/or relationships between data not specific to any particular tenant or that otherwise is common between two or more tenants. The one or more tenant-specific training datasets can include data and/or relationships between data specific to a particular tenant. For example, three distinct tenants may provide data to the computing system 104, and the computing system 104 can generate three distinct tenant-specific training datasets, each of which corresponding to a respective tenant of the three distinct tenants. The tenant-generic datasets and/or the one or more tenant-specific datasets can include different terms that describe the same or similar entity, object, feature, attribute, etc. For example, the tenant-generic training dataset may describe a particular entity as a user, while one of the tenant-specific training datasets may describe the particular entity as a client, etc. The computing system 104 may train the machine-learning layer 110 or any graph-based machine-learning model thereof prior to receiving the natural language input 102, synchronously with respect to receiving the natural language input 102, and/or periodically asynchronously without regard to when the natural language input 102 was received but at a frequency that otherwise allows the trained machine-learning layer 110 to benefit from further training before a future use.

Example of a Process for Generating a Rule from Natural Language Input

Figure 2:
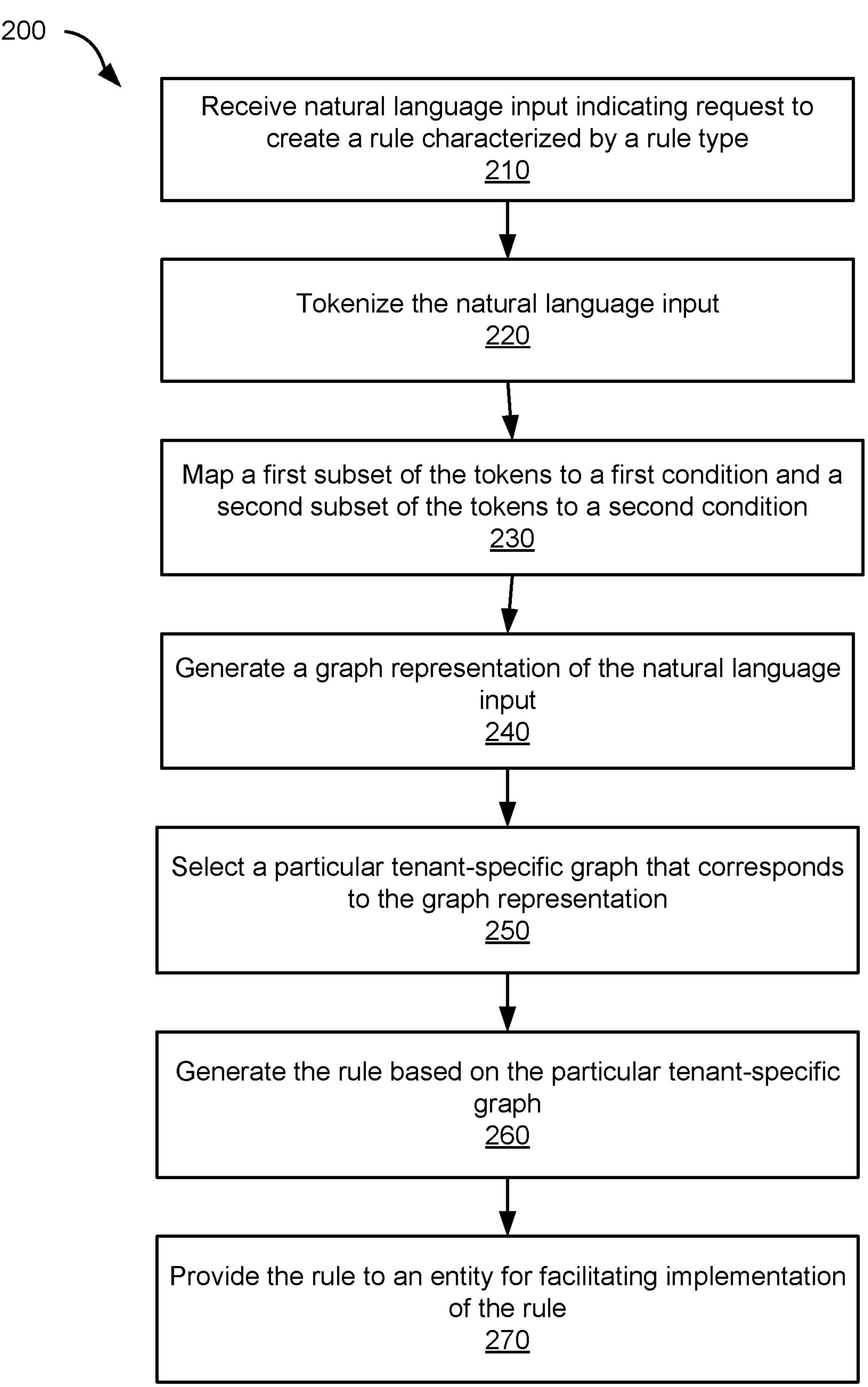
FIG. 2 is a flowchart of a process for generating a rule using natural language input according to an embodiment.

FIG. 2 is a flowchart of a process 200 for generating a rule using natural language input according to an embodiment. The process 200 may be performed at least in part by any of the components described in the figures herein, for example, by any component of the data processing environment 100 or by the data processing environment 100, itself. The process 200 can begin at block 210, when the computing system 104 receives natural language input 102 that indicates a request for generating a rule. In some embodiments, the natural language input 102 is generated by an entity and is input, for example via a keyboard, microphone, camera, or the like, into the computing system 104. The rule can have or otherwise be characterized by a rule type, which can include an indication of a rule-based language, one or more conditions, and one or more actions. The indication may include syntax, formatting, and the like corresponding to a particular rule-based language, but the syntax, formatting, and the like included in the natural language input may not be proper for the rule-based language. The condition may include a conditional statement and/or an indication of a conditional statement such as an "if" conditional statement, a "when" conditional statement, or other similar conditional statements. The action may include instructions that can be executed by the computing system 104 in response to the condition being satisfied. In a particular example, the condition may be an "if" statement, such as "if an email is received from entity X," and the action may be a "then" statement such as "then, store the received email in database Y." Other examples of conditions and actions, such as examples relating to query rules, storage rules, and the like, are possible.

At block 220, the computing system 104 tokenizes the natural language input 102. The computing system 104 may tokenize characters, strings, words, phrases, and/or other features of the natural language input 102. For example, the computing system 104 can tokenize the words included in the natural language input 102 such that a number of tokens is equal to the number of words included in the natural language input 102. In other examples, the computing system 104 can identify potentially important strings or phrases, such as "what is" or other indications of questions, rules, or the like. Accordingly, the computing system 104 tokenizes the identified strings or phrases additionally or alternatively to tokenizing the words of the natural language input 102. The computing system 104 can tokenize any other combination of characters, strings, words, phrases, punctuations, and the like of the natural language input 102.

At block 230, the computing system 104 maps a first subset of the tokens to a first condition and a second subset of the tokens to a second condition. The first subset of the tokens may include tokens corresponding to nouns, verbs, or other particular words, phrases, and the like that indicate the first condition. For example, the first subset of the tokens can include one or more noun that indicates the rule relates to querying a database for men in a particular geographic location. Additionally, the second subset of the tokens may include tokens corresponding to nouns, verbs, or other particular words, phrases, and the like that indicate the second condition. For example, the second subset of the tokens can include one or more nouns (or other words, phrases or characters) that indicate the rule relates to querying a database for men that are interested in home improvement. Mapping the first subset of the tokens to the first condition and the second subset of the tokens to the second condition can involve generating or identifying a rule template that incorporates or otherwise corresponds to the first condition and the second condition. For example, if the first condition and the second condition indicate that the rule relates to querying the database for men in a particular geographic location that are interested in home improvement, the computing system 104 can identify or otherwise access a rule template for generating an SQL query. Other conditions and templates may be used, identified, accessed, or the like by the computing system 104 in response to mapping the tokens.

At block 240, the computing system 104 generates a graph representation of the natural language input 102. In some embodiments, the graph representation of the natural language input 102 includes one or more nodes and one or more attributes. The nodes may each be connected to corresponding attributes and/or connected to other nodes in the graph representation. The nodes can be generated based on the first subset of the tokens, and the attributes can be based on the second subset of the tokens. For examples, the nodes can include one or more nodes corresponding to one or more tokens of the first subset of the tokens. In a particular example, the first subset of the tokens includes two tokens that indicate two distinct entities (e.g., users, clients, etc.), and the computing system 104 generates a first node for a first entity and a second node for a second entity. Additionally, the attributes can include one or more attributes corresponding to one or more tokens of the second subset of the tokens. In the particular example, the second subset of the tokens includes seven tokens corresponding to four distinct attributes such as age, gender, geographic location, and topic of interest. Three of the tokens may indicate age, gender, and geographic location for the first entity, so the computing system 104 generates three attributes corresponding to the three tokens and associated with (e.g., connected to) the first node. The remaining four tokens may indicate age, gender, geographic location, and topic of interest for the second entity, so the computing system 104 generates four attributes corresponding to the four tokens and associated with (e.g., connected to) the second node. In some embodiments, the first node is separate from the second node, though in other embodiments, for example if the first entity is related to the second entity, the computing system 104 may connect the first node and the second node. The computing system 104 can output the graph representation or may otherwise use the graph representation to generate a rule based on the natural language input 102.

At block 250, the computing system 104 selects a particular tenant-specific graph that corresponds to the graph representation of the natural language input 102. In some embodiments, the computing system 104 generates or accesses a set of tenant-specific graphs. The set of tenant-specific graphs may each include a similar or different set of nodes and connected attributes, and the set of tenant-specific graphs may be generated by the graph-based machine-learning model. For example, the computing system 104 trains the graph-based machine-learning model using a set of custom schema, each schema of the set of custom schema corresponding to different tenant-specific data, and the trained graph-based machine-learning model can generate the set of tenant-specific graphs based on the different tenant-specific data.

The computing system 104 can compare the graph representation of the natural language input 102 to each tenant-specific graph of the set of tenant-specific graphs. In some embodiments, the comparison involves determining a similarity score between the graph representation and each tenant-specific graph, a distance between the graph representation and each tenant-specific graph, or the like. Additionally, the computing system 104 may compare an arrangement and/or content of nodes and attributes from the graph representation to an arrangement and/or content of nodes and attributes from each tenant-specific graph to determine the similarity score between the graph representation and each tenant-specific graph, the distance between the graph representation and each tenant-specific graph, etc. Based on the comparison, the computing system 104 can select the particular tenant-specific graph. For example, the computing system 104 selects the particular tenant-specific graph that minimizes the distance between the particular tenant-specific graph and the graph representation, that maximizes the similarity score between the particular tenant-specific graph and the graph representation, etc. In some embodiments, selecting the particular tenant-specific graph includes replacing the nodes, attributes, and relationships thereof of the graph representation with the nodes, attributes, and relationships thereof of the particular tenant-specific graph, or otherwise adjusting the graph representation based on the particular tenant-specific graph.

At block 260, the computing system 104 generates a rule based on the particular tenant-specific graph. The computing system 104 can identify a rule template based on the natural language input 102. For example, the computing system 104 selects the rule template based on indications about the rule type provided by the natural language input 102. In a particular example, the natural language input 102 may include "men in San Francisco interested in home improvement," and, for example subsequent to tokenizing the natural language input 102 and/or mapping the tokens, the computing system 104 determines that the rule type includes a query. Thus, the computing system 104 selects a query template for generating the rule.

In some embodiments, the rule template can include a query, a nested query, a subquery, a conditional storage rule, or other suitable types of rule templates. The rule template may include fundamental portions of the rule. In examples in which the rule type is a query and the rule template is a query template, the query template may include placeholder clauses and/or placeholder nouns that can be adjusted by the computing device based on the mappings derived from the natural language input 102. The computing system 104, for example based on the mappings, can determine that the natural language input 102 involves a nested query to select individuals of a particular gender from the city of San Francisco. Thus, the computing system 104 can select or generate a query template that includes an "ANY" clause nested in a "SELECT" clause, or other suitable combinations of SQL clauses for generating the rule.

Subsequent to selecting or otherwise accessing the rule template, the computing system 104 adjusts the template based on the particular tenant-specific graph. For example, the computing system 104 can populate empty fields of the rule template using the nodes and/or attributes of the particular tenant-specific graph. Additionally or alternatively, the computing system 104 can adjust placeholder or generic features of the rule template using the nodes and/or attributes of the particular tenant-specific graph. In a particular example, the rule template may be a query template that includes a query with a "SELECT" clause with empty fields corresponding to an entity to be selected and/or the group from which to select the entity. The computing system 104 can adjust the empty fields with relevant nodes and/or attributes from the particular tenant-specific graph. For example, the computing system 104 can update the entity field with "men" and the group field with "San Francisco," indicating that the query requested from the natural language input 102 may be a query for men living in San Francisco. The adjusted rule template may be or otherwise include the rule generated (e.g., the generated rule 105) by the computing system 104.

At block 270, the computing system 104 provides the rule to the entity for facilitating implementation of the rule. The computing system 104 may output the rule via a user interface transmitted to the user device that requested the rule. In some embodiments, the machine-learning layer 110 may generate the rule and may transmit the rule to the user interface layer 106, for example via the API layer 108, for providing the rule to the entity. Additionally, providing the rule to the entity may facilitate implementation of the rule. For example, the computing system 104 may receive input from the entity indicating acceptance of the rule, and, in response to receiving the input, the computing system 104 may implement or otherwise execute the rule. In some embodiments, the computing system 104 may additionally facilitate adjustment (e.g., optimization) of the rule by the entity by providing the rule to the entity.

Example of a Process for Training a Graph-Based Machine-Learning Model

Figure 3:
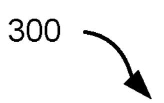
FIG. 3 is a flowchart of a process for training a graph-based machine-learning model and pre-generating tenant-specific graphs for generating a rule using natural language input according to an embodiment.
Figure 3:
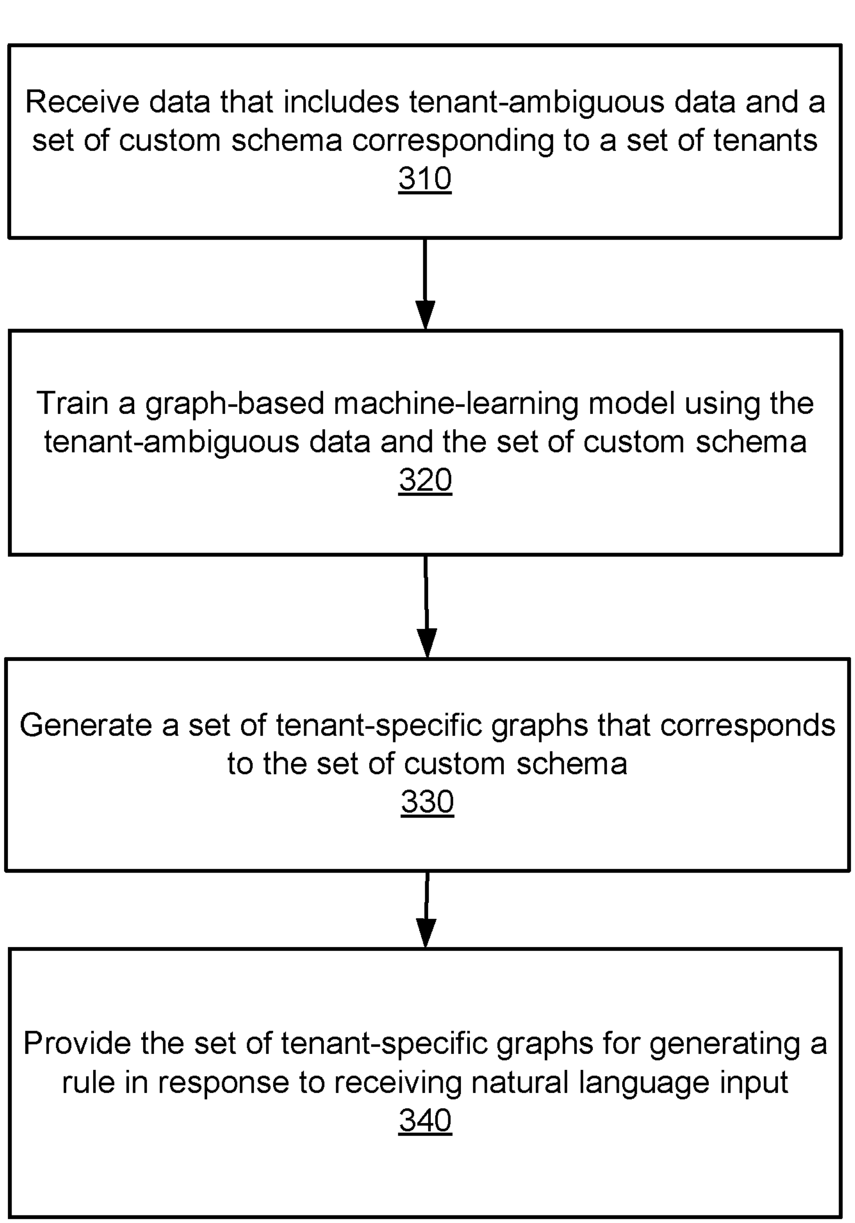

FIG. 3 is a flowchart of a process 300 for training a graph-based machine-learning model and pre-generating tenant-specific graphs for generating a rule using natural language input according to an embodiment. The process 300 may be performed at least in part by any of the components described in the figures herein, for example, by any component of the data processing environment 100 or by the data processing environment 100, itself. The process 300 can begin at block 310, when the computing system 104 receives data that includes tenant-ambiguous data and a set of custom schema corresponding to a set of tenants. The tenant-ambiguous data may include data that is generic with respect to two or more tenants of the set of tenants, that is included in data associated with two or more tenants of the set of tenants, or the like. Additionally, each custom schema of the set of custom schema can include data specific to a corresponding tenant of the set of tenants. In some embodiments, data specific to the corresponding tenant may not include data specific to a different tenant of the set of tenants.

At block 320, the computing system 104 trains a graph-based machine-learning model using the tenant-ambiguous data and the set of custom schema. The computing system 104 may use the training layer 112 to train the machine-learning layer 110, or any graph-based machine-learning model thereof, using the tenant-ambiguous data and the set of custom schema. In some embodiments, the computing system 104 trains the graph-based machine-learning model with the tenant-ambiguous data separately from training the graph-based machine-learning model using the set of custom schema. Training the graph-based machine-learning model may involve supervised training techniques in which the tenant-ambiguous data and/or each custom schema of the set of custom schema include labels that can facilitate learning by the graph-based machine-learning model. In some embodiments, the computing system 104 inputs training data, such as the tenant-ambiguous data and/or one or more custom schema of the set of custom schema, into the graph-based machine-learning model, and optimizes weights of layers included in the graph-based machine-learning model to optimize predictions generated by the graph-based machine-learning model. Any other techniques for training the graph-based machine-learning model using, for example separately, the tenant-ambiguous data and the set of custom schema can be used by the computing system 104.

At block 330, the computing system 104 generates a set of tenant-specific graphs that corresponds to the set of custom schema. Each tenant-specific graph of the set of tenant-specific graphs may be generated based on a different custom schema of the set of custom schema. For example, if the custom schema includes three different custom schema, then the computing system 104 may generate three tenant-specific graphs, each based on a different custom schema of the three different custom schema. In other embodiments, the set of tenant-specific graphs may include different numbers (e.g., less than three or more than three) of tenant-specific graphs and may not be in one-to-one correspondence with the set of custom schema.

In some embodiments, each tenant-specific graph of the set of tenant-specific graphs includes a set of nodes and a set of attributes associated with the set of nodes. The set of nodes can include one or more nodes that may each correspond to a type of entity or other suitable type of condition that can be included in a rule request. Additionally, the set of attributes can include one or more attributes that may each correspond to an attribute associated with the nodes. In an example, the attributes can include descriptive characteristics, such as a geographic location, a nationality, etc., of an entity or other condition associated with the one or more nodes.

At block 340, the computing system 104 provides the set of tenant-specific graphs for generating a rule in response to receiving the natural language input 102. The computing system 104 may generate and output the set of tenant-specific graphs based on the set of custom schema. In some embodiments, the computing system 104 may locally or externally store the set of tenant-specific graphs such that the computing system 104 may subsequently, for example in response to receiving a request to generate a rule, access the set of tenant-specific graphs. Additionally or alternatively, the computing system 104 may provide the set of tenant-specific graphs to the machine-learning layer 110 to facilitate the machine-learning layer 110 generating the requested rule.

Example of a Process for Retraining the Graph-Based Machine-Learning Model

Figure 4:
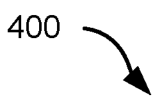
FIG. 4 is a flowchart of a process for retraining the graph-based machine-learning model in response to receiving an adjustment to a generated rule.
Figure 4:
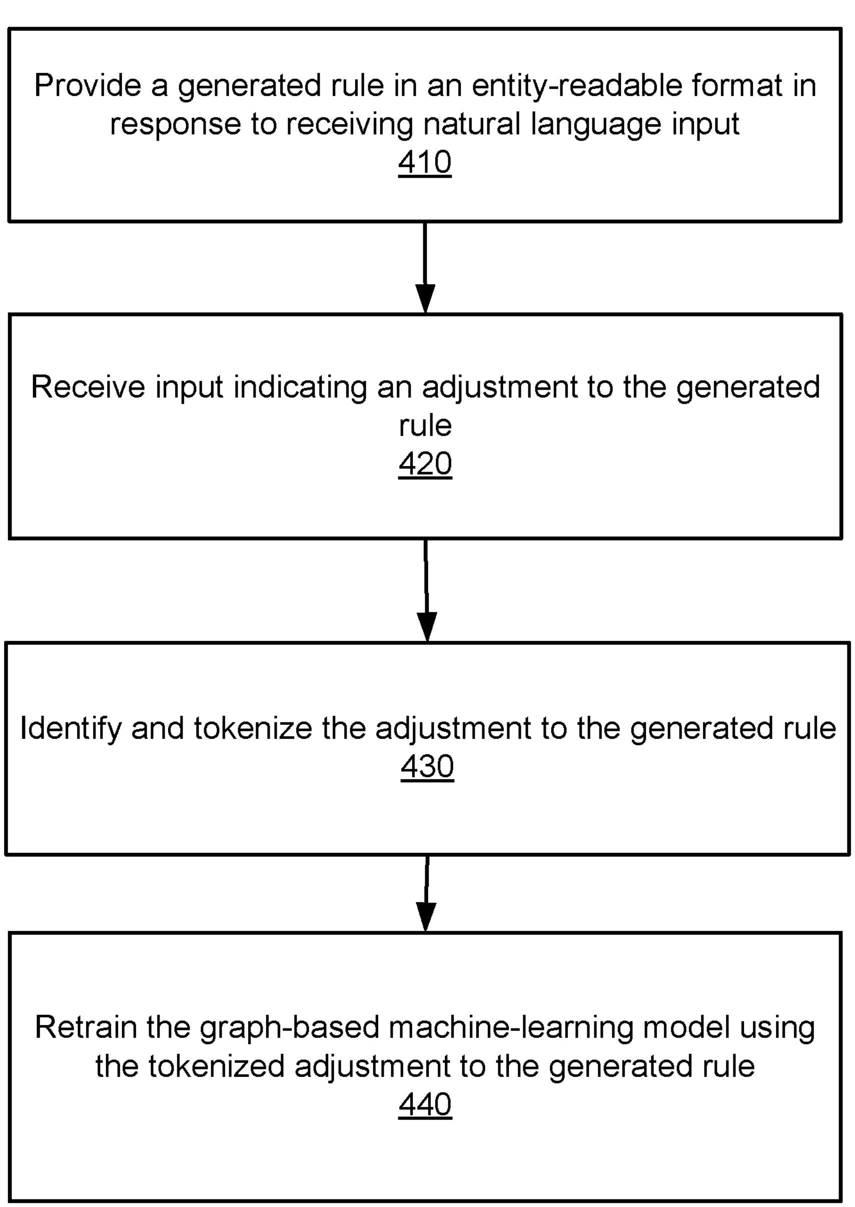

FIG. 4 a flowchart of a process 400 for retraining the graph-based machine-learning model in response to receiving an adjustment to a generated rule 105. The process 400 may be performed at least in part by any of the components described in the figures herein, for example, by any component of the data processing environment 100 or by the data processing environment 100, itself. The process 400 can begin at block 410, when the computing system 104 provides a generated rule 105 in an entity-readable format in response to receiving natural language input 102. The generated rule 105 may be generated by the computing system 104 using the operations described with respect to the process 200. Additionally, the computing system 104, for example via the user interface layer 106, can provide the generated rule 105 to a user device that can be used by an entity.

The computing system 104 can generate a user interface that can provide the generated rule 105, and the computing system 104 can convert the generated rule 105 from a proper, rule-based language format, which may be executable by the computing system 104, to an entity-readable format such as natural language that can be understood by the entity. In some embodiments, the computing system 104 includes the generated rule 105 in a proper, rule-based language format and in the entity-readable format on the user interface. The user interface may additionally include one or more interactive features configured to solicit and/or receive input from the entity for adjusting the generated rule 105.

At block 420, the computing system 104 receives input indicating an adjustment to the generated rule 105. The input may be generated by the entity and may be input into the user interface provided by the computing system 104. In some embodiments, the input includes adjustments to the generated rule 105. The adjustments can include an adjustment to a condition included in the generated rule 105, an adjustment to an action associated with a condition included in the generated rule 105, an adjustment to the rule type of the generated rule 105, other adjustments for optimizing the generated rule 105, or any combination thereof. The input may be provided by the entity via a computer mouse (e.g., clicking a drop-down menu and selecting an option to adjust a rule type, condition, and/or action of the generated rule 105), via a keyboard (e.g., typing rule-based language or natural language to adjust a rule type, condition, and/or action of the generated rule 105), or via other types of input that can be received via the user interface provided by the computing system 104.

At block 430, the computing system 104 identifies and tokenizes the input for adjusting the generated rule 105. For example, the entity can provide natural language input into the user interface, and the computing system 104 can tokenize the natural language input. Tokenizing the input may involve tokenizing characters, strings, words, phrases, punctuation, and/or other features of the input. For example, the computing system 104 tokenizes nouns, verbs, punctuation, and/or other features of the input. In some embodiments, the computing system 104 tokenizes characters, strings, words, phrases, punctuation, and/or other features of the input that indicate adjustments to the generated rule 105. For example, the computing system 104 can identify that a particular condition, action, and/or rule type is indicated to be adjusted based on one or more features of the input, and, in response to the identification, the computing system 104 tokenizes the one or more features of the input.

At block 440, the computing system 104 retrains the graph-based machine-learning model using the tokenized input for adjusting the generated rule 105. In response to receiving the input and/or adjusting the generated rule 105 based on the tokenized input, the computing system 104 retrains the graph-based machine-learning model using the tokenized input, the adjusted rule, or a combination thereof. For example, the computing system 104 compares the generated rule 105 with the updated rule, determines the override changes, and updates training data, such as the tenant-ambiguous data and/or the set of custom schema, and/or the graph-based machine-learning model itself based on the override changes. In response to updating the training data and/or the graph-based machine-learning model, the computing system 104 retrains, for example using the training layer 112, the graph-based machine-learning model to incorporate the adjustments indicated by the input received at the block 420.

Example of a Data Flow for Generating a Rule Using Natural Language Input

Figure 5:
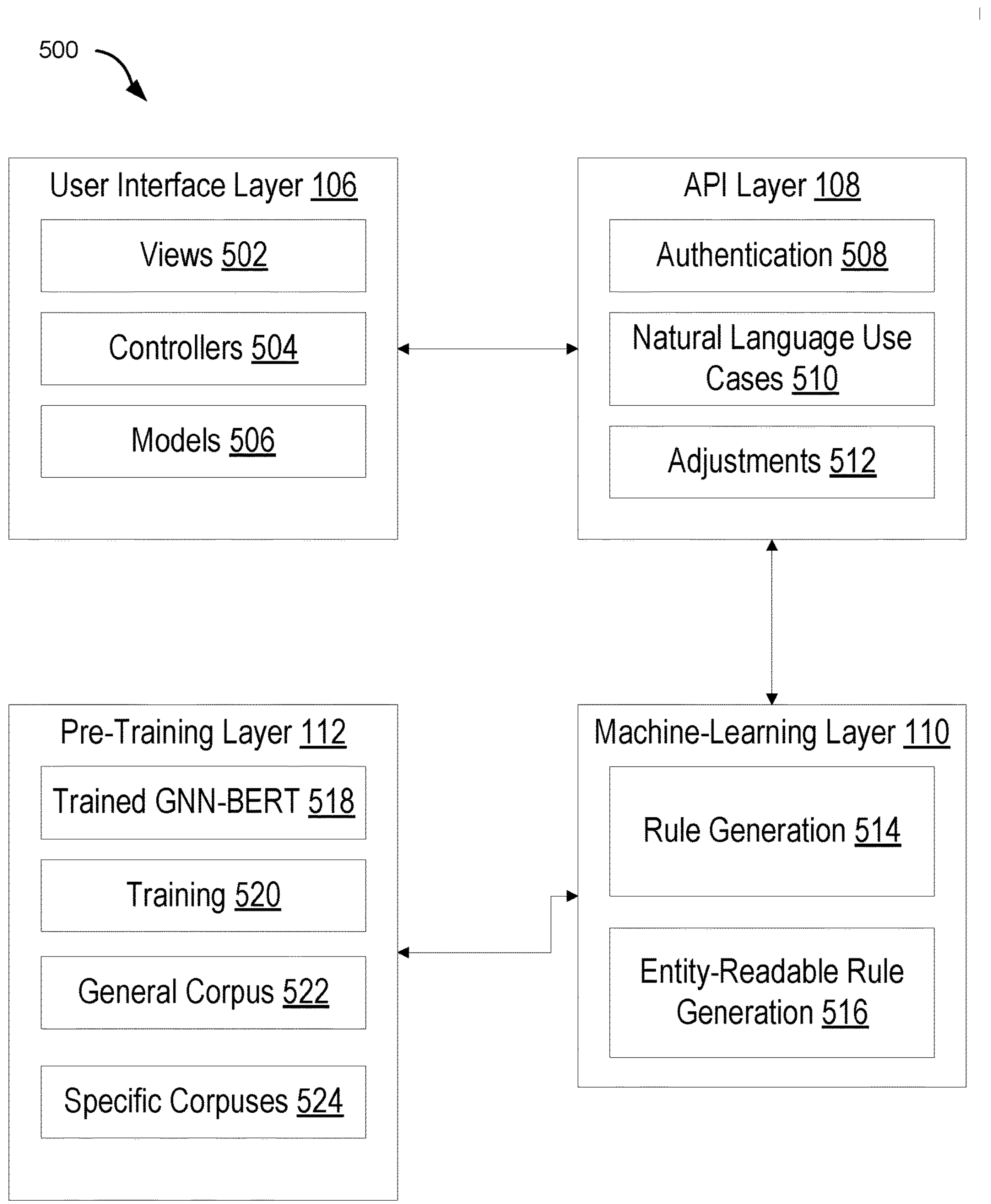
FIG. 5 is a data flow diagram of data flow for generating a rule using natural language input according to an embodiment.

FIG. 5 is a data flow diagram 500 of data flow with respect to the computing system 104 for generating a rule using natural language input according to an embodiment. The data flow diagram 500 may begin with the user interface layer 106 of the computing system 104 generating a user interface to provide via a user device that can be used by an entity. The user interface layer 106 can generate the user interface that includes views 502, such as sub-pages and features that can be included in the user interface, controllers 504, such as interactive features and the like that can be included in the user interface, and/or models 506 such as rule templates and the like, that can be included in the user interface. In some embodiments, the views 502, the controllers 504, and/or the models 506 are included in the user interface as backend processes (e.g., not viewable by the entity or other user of the user device), but one or more of the views 502, the controllers 504, and/or the models 506 may be displayed on the user device via the user interface.

The user interface layer 106 provides the user interface to the user device. For example, the user interface layer 106 can transmit the user interface via any suitable network, such as a local area network, a wide area network, or the like, to the user device. The entity can generate a request using the user interface, and the user interface layer 106 can receive the generated request via the user interface. In some embodiments, the request includes an indication that the entity requested a rule to be generated based on natural language input provided, for example via the user interface, by the entity. The user interface layer 106 is communicatively coupled at least to the API layer 108 and can transmit the generated request to the API layer 108 for further processing.

The API layer 108 receives the generated request from the user interface layer 106. In some embodiments, the generated request includes the natural language input in addition to authentication information, metadata about the request and the entity, and other information that can facilitate the computing system 104 processing the generated request. The API layer 108 can include one or more application programming interfaces that can perform various tasks. For example, and as illustrated in FIG. 5, the API layer 108 includes authentication 508, natural language use cases 510, and adjustments 512, which each may be, use, or otherwise involve a different application programming interface. The authentication 508 may involve authenticating the generated request. For example, the authentication 508 compares the authentication information and/or the metadata received with the generated request with existing data, such as access-level information, and the like, about the entity to prevent unauthorized access to services provided by the computing system 104, etc. Additionally, the API layer 108 may be configured to make one or more API calls, for example via natural language use cases 510, to determine rule types, rule templates, and the like based on the generated request. In response to authenticating the generated request, the API layer 108 may transmit the generated request to the machine-learning layer 110 of the computing system 104.

The machine-learning layer 110 of the computing system 104 is communicatively coupled at least to the API layer 108 of the computing system 104. The machine-learning layer 110 can receive the authenticated, generated request from the API layer 108 and can generate the requested rule. In some embodiments, the machine-learning layer 110 includes or is otherwise configured to execute a graph-based machine-learning model to generate the requested rule based on the natural language input received with the generated request. The machine-learning layer 110 can generate the requested rule via rule generation 514 that can, for example, tokenize the natural language input, map the tokens to one or more conditions of the requested rule, generate a graph representation of the natural language input, select a particular, pre-generated tenant-specific graph, and/or generate the rule based on the particular, pre-generated tenant-specific graph. Additionally, the machine-learning layer 110 generates the rule in an entity-readable format using entity-readable rule generation 516. In some embodiments, the machine-learning layer 110 provides the generated rule (e.g., in a machine-readable format) and the entity-readable generated rule (e.g., in an entity-readable format such as natural language) to the entity. The machine-learning layer 110 can transmit the generated rule and the entity-readable generated rule to the API layer 108, which can transmit the generated rule and the entity-readable generated rule to the user interface layer 106. The user interface layer 106 can generate a user interface with the generated rule and the entity-readable generated rule and transmit the user interface to the user device to provide the generated rule and the entity-readable generated rule to the entity. Additionally, the user interface layer 106 may receive adjustments to the generated rule, and the user interface layer 106 may transmit the adjustments to the API layer 108, for example via adjustments 512 that can facilitate adjustments to the rule.

The machine-learning layer 110 is additionally communicatively coupled with at least the training layer 112 of the computing system 104. The training layer 112 may provide training services and facilitate training operations with respect to the machine-learning layer 110, or any machine-learning model thereof. In some embodiments, the training layer 112 may generate a trained GNN-BERT 518, which may be trained to generate a rule based on natural language input. For example, the GNN-BERT 518 may include any number of permutation equivariant layers, pooling layers, BERT layers, and the like for allowing the GNN-BERT 518 to generate a rule based on natural language input.

In other embodiments, the training layer 112 trains a GNN-BERT, or other similar graph-based machine-learning model, included in the machine-learning layer 110. The training layer 112 can perform training 520, which can involve inputting a general corpus 522 and/or specific corpuses 524 into the GNN-BERT 518 to train the GNN-BERT 518 to generate rules based on natural language input. The general corpus 522 may include various industry-accepted terms or other tenant-generic data, and the specific corpuses 524 may include various tenant-specific data. Additionally, the training layer 112 can retrain the GNN-BERT 518, or other graph-based machine-learning model associated with the machine-learning layer 110, in response to the computing system 104 receiving input indicating an adjustment or manual override to a previously generated rule.

Examples of User Interfaces

Figure 6:
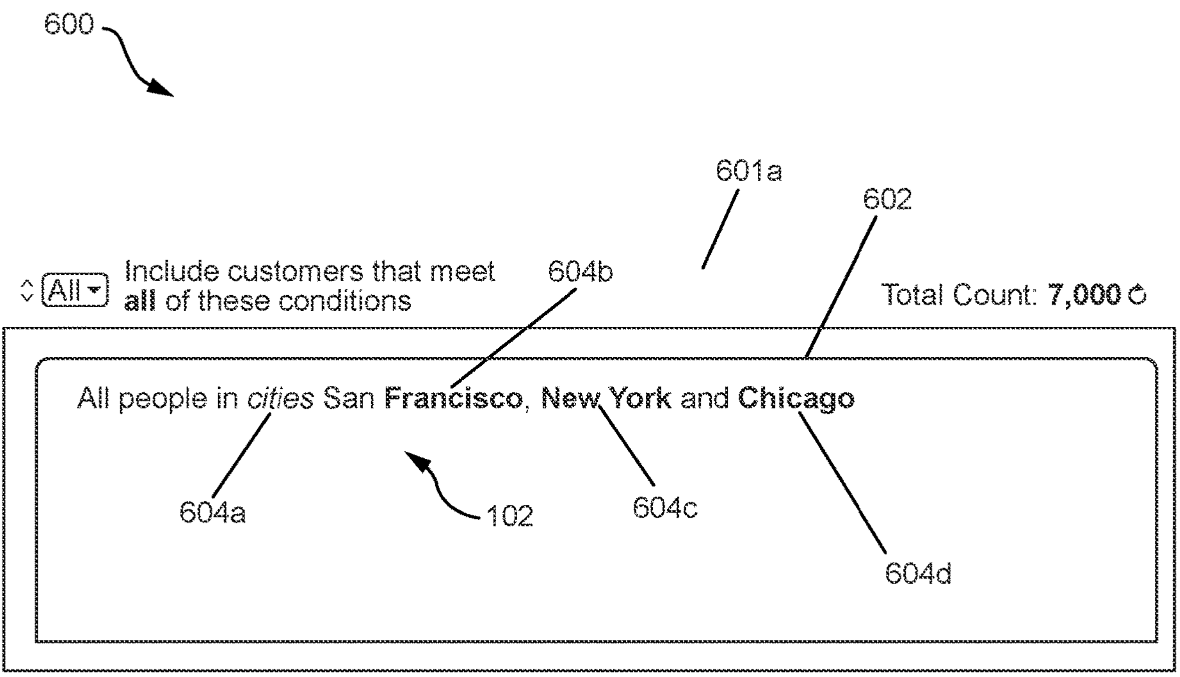
FIG. 6 is an example of a user interface for receiving natural language input and for providing a generated rule according to an embodiment.
Figure 6:
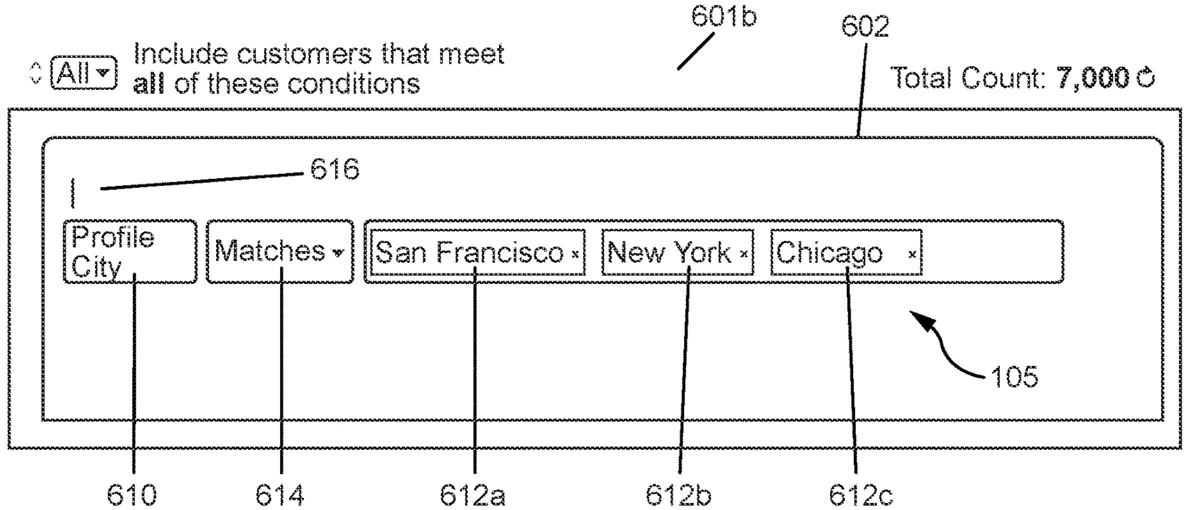

FIG. 6 is an example of a user interface 600 for receiving natural language input 102 and for providing a generated rule 105 according to an embodiment. As illustrated, the user interface 600 includes a first configuration 601*a* and a second configuration 601*b*. The first configuration 601*a* involves an entity providing the natural language input 102 via the user interface 600, and the second configuration 601*b* involves the user interface 600 providing the generated rule 105 in an entity-readable format.

As illustrated in the first configuration 601*a*, the natural language input 102 is received via the user interface 600. The natural language input 102 can include various characters, strings, words, phrases, and the like for indicating a request for a rule to be generated. As illustrated, the natural language input 102 is received in a first interactive feature 602 and includes words 604*a-d* that include a first word 604*a* (e.g., "cities"), a second word 604*b* (e.g., "San Francisco"), a third word 604*c* (e.g., "New York"), and a fourth word 604*d* (e.g., "Chicago"). The words 604*a-d* can be tokenized by the computing system 104 that provides the user interface 600. For example, the computing system 104 generates a token for each word of the words 604*a-d*. The computing system 104 may map the token corresponding to the first word 604*a* to a first condition and may map the tokens corresponding to the words 604*b-d* to a second condition. In some embodiments, the computing system 104 may tokenize the natural language input 102 and map the tokens to conditions in other suitable manners.

The mapped tokens can be used to generate the rule. For example, and as illustrated in the second configuration 601*b*, the user interface presents the generated rule 105 that is based on the mapped tokens of the natural language input 102. As illustrated, the generated rule 105 is a nested query that includes a condition 610 (e.g., "city") and attributes 612*a-c* corresponding to the condition 610. The nested query may involve an "ALL" clause, for example for searching for all individuals in a particular city, and the nested query may involve a "SELECT" clause for selecting individuals residing in cities corresponding to the attributes 612*a-c*. The attributes 612*a-c* include a first attribute 612*a* (e.g., "San Francisco"), a second attribute 612*b* (e.g., "New York"), and a third attribute 612*c* (e.g., "Chicago"). Additionally, the generated rule 105 includes an indicator 614 of how the attributes 612*a-c* relate to the condition 610. For example, the indicator 614 indicates that the attributes 612*a-c* of the query match the condition 610, though the indicator 614 may otherwise indicate other relationships (e.g., does not match, similar to, and the like) between the attributes 612*a-c* and the condition 610.

The second configuration 601*b* additionally includes an input field 616. The input field 616 may be provided along with the generated rule 105 to allow the entity to adjust the generated rule 105. For example, the user interface 600 may facilitate natural language input via the input field 616, and the natural language input may include indications for adjusting the rule, or any condition, attribute, or the like thereof. In some embodiments, the user interface 600 can receive input for adjusting the generated rule 105 via a computer mouse (e.g., selecting a different indicator 614) or other techniques for receiving input for adjusting the generated rule 105.

Figure 7:
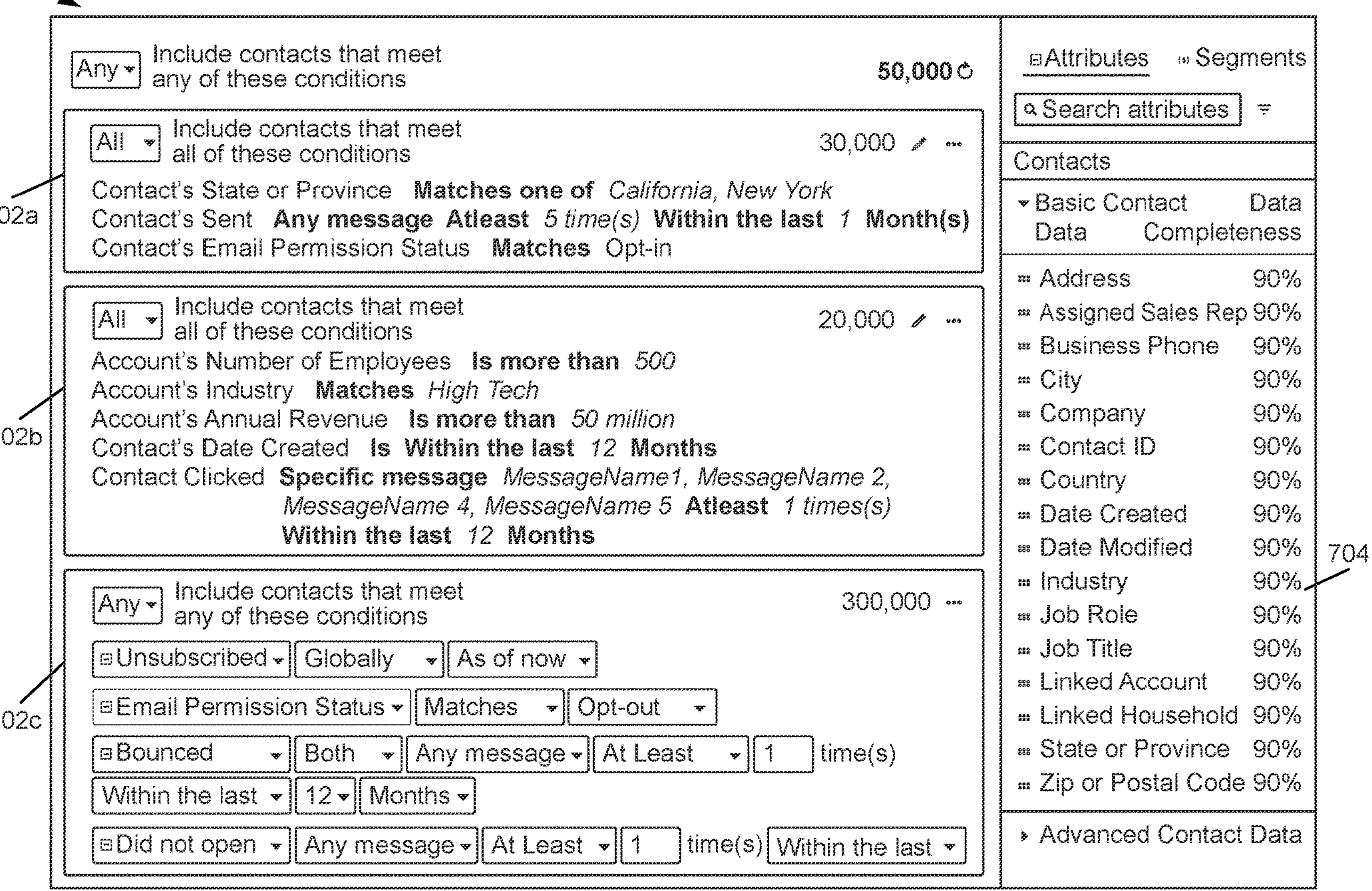
FIG. 7 is an example of a user interface for providing a generated rule and receiving an adjustment to the generated rule according to an embodiment.

FIG. 7 is an example of a user interface 700 for providing a generated rule 105 and receiving an adjustment to the generated rule 105 according to an embodiment. As illustrated, the user interface 700 provides the generated rule 105 that includes a first condition set 702*a*, a second condition set 702*b*, and a third condition set 702*c* for the generated rule 105, though other numbers (e.g., less than three or more than three) of condition sets are possible to be provided via the user interface 700. As illustrated, the first condition set 702*a* involves the conditions of entities in a particular location that have sent a particular amount of messages in a predetermined time period. Additionally, the second condition set 702*b* involves the conditions of entities with particular employment statistics in a predetermined time period. And, the third condition set 702*c* involves the conditions of excluding entities associated with various condition attributes. The user interface 700 additionally includes a list of attributes 704 that can include one or more interactive features.

The user interface 700 can facilitate adjustments to one or more condition sets of the generated rule 105. For example, the list of attributes 704 may be interactive such that an entity can provide input (e.g., via a computer mouse or computer keyboard) to select new or different attributes or conditions to include in the first condition set 702*a*, the second condition set 702*b*, and/or the third condition set 702*c*. In a particular example, the entity may drag an attribute, such as "city" or other attribute, etc., to one of the condition sets to adjust the generated rule 105. Additionally or alternatively, the entity may provide typed natural language input, for example via an input field 616, to adjust the generated rule 105 using the user interface 700.

Figure 8:
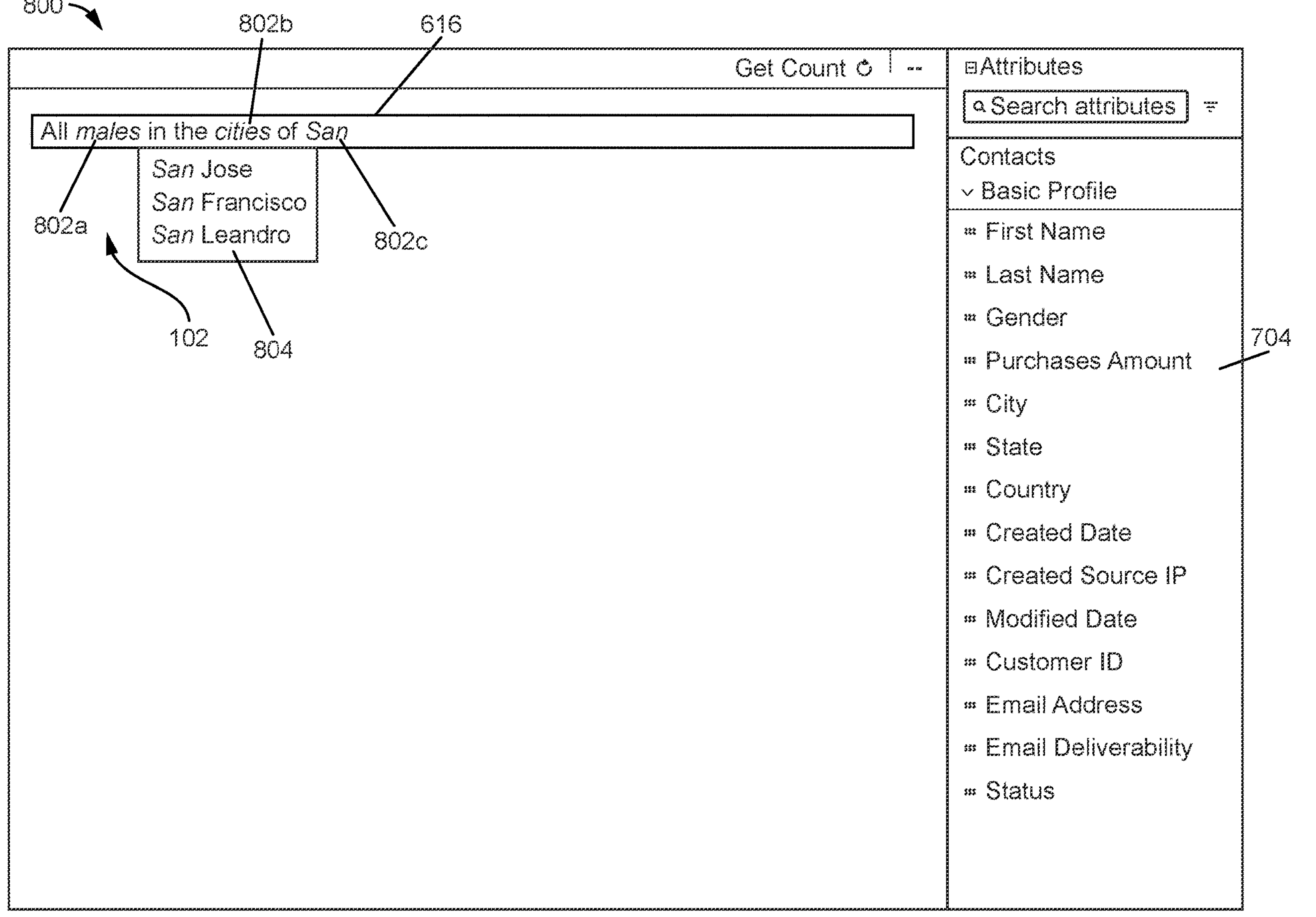
FIG. 8 is an example of a user interface for receiving natural language input for generating a rule according to an embodiment.

FIG. 8 is an example of a user interface 800 for receiving natural language input 102 for generating a rule according to an embodiment. As illustrated, the user interface 800 includes the list of attributes 704 and the input field 616, though the user interface 800 may additionally or alternatively include other components, fields, and the like for facilitating the computing system 104 generate a rule based on natural language input 102. In some embodiments, FIG. 8 illustrates a real-time (e.g., synchronous) input of natural language input 102 into the user interface 800.

As illustrated, a portion of the natural language input 102 is input into the user interface 800. The portion includes words 802*a-b* that can be tokenized and mapped by the computing system 104. For example, the word 802*a* (e.g., "males") is tokenized and mapped to a first condition of male entities, and the word 802*b* (e.g., "cities") is tokenized and mapped to a second condition of cities in which an entity exists. The natural language input 102 can additionally include a portion of a third word 802*c* (e.g., "San"), which may represent a beginning of a word the entity intends to provide via the user interface 800. The user interface can include a set of suggestions 804 for finishing the word. For example, the computing system 104 can identify that the portion of the third word 802*c* corresponds to the second condition and is likely an attribute of the second condition. Accordingly, since the second condition includes cities, the computing system 104 can generate the set of suggestions 804 that includes a list of city names that begin with, or otherwise include, the portion of the third word 802*c*. The user interface 800 can be configured to provide additional, real-time suggestions for completing the natural language input 102, adjusting any generated rule, or a combination thereof.

Illustrative Systems

Figure 9:
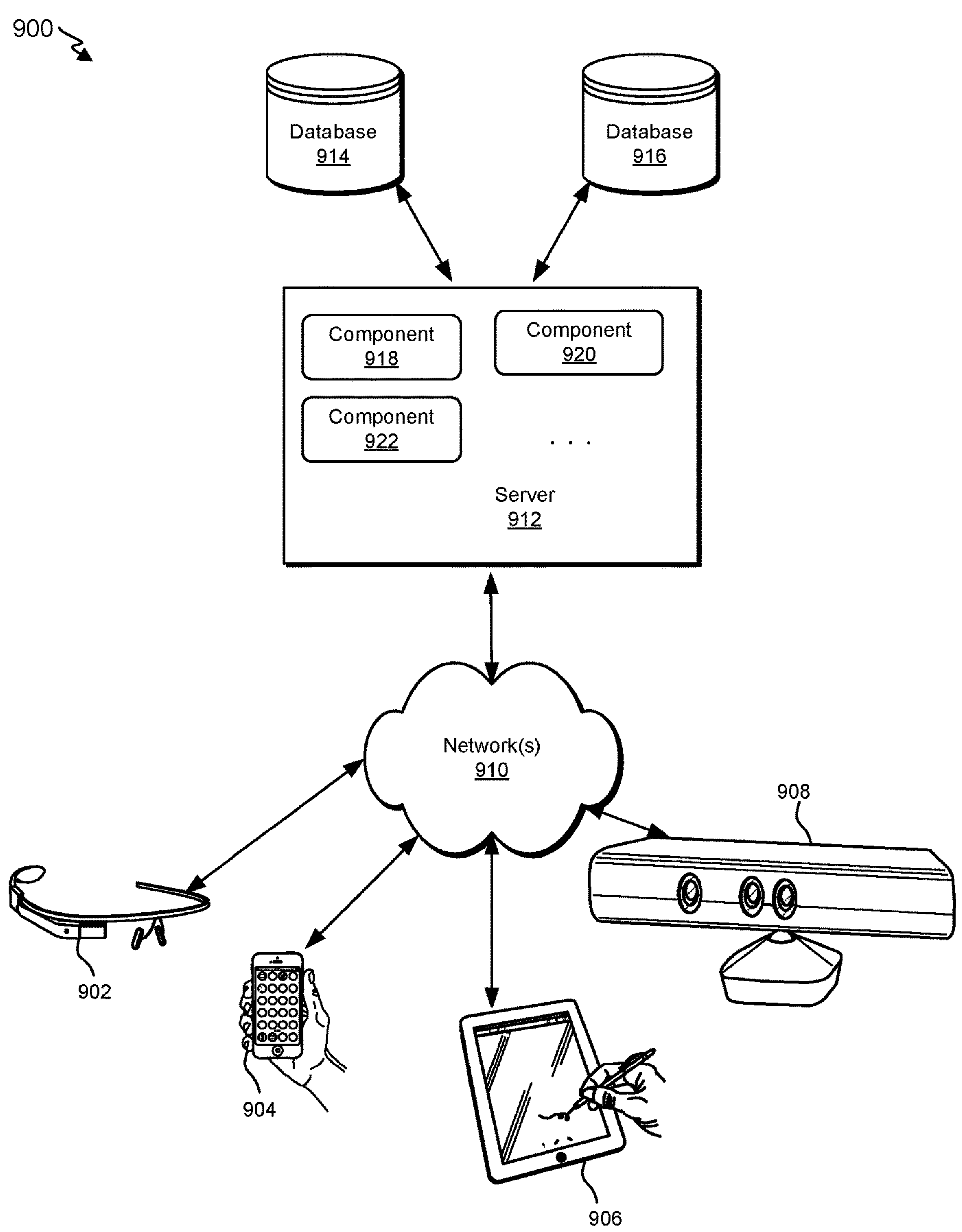
FIG. 9 is a simplified diagram illustrating a distributed system for implementing one of the embodiments.

FIG. 9 depicts a simplified diagram of a distributed system 900 for implementing one of the embodiments. In the illustrated embodiment, distributed system 900 includes one or more client computing devices 902, 904, 906, and 908, which are configured to execute and operate a client application such as a web browser, proprietary client (e.g., Oracle Forms), or the like over one or more network(s) 910. Server 912 may be communicatively coupled with remote client computing devices 902, 904, 906, and 908 via network(s) 910.

In various embodiments, server 912 may be adapted to run one or more services or software applications provided by one or more of the components of the system. In some embodiments, these services may be offered as web-based or cloud services or under a Software as a Service (SaaS) model to the users of client computing devices 902, 904, 906, and/or 908. Users operating client computing devices 902, 904, 906, and/or 908 may in turn utilize one or more client applications to interact with server 912 to utilize the services provided by these components.

In the configuration depicted in the figure, the software components 918, 920 and 922 of distributed system 900 are shown as being implemented on server 912. In other embodiments, one or more of the components of distributed system 900 and/or the services provided by these components may also be implemented by one or more of the client computing devices 902, 904, 906, and/or 908. Users operating the client computing devices may then utilize one or more client applications to use the services provided by these components. These components may be implemented in hardware, firmware, software, or combinations thereof. It should be appreciated that various different system configurations are possible, which may be different from distributed system 900. The embodiment shown in the figure is thus one example of a distributed system for implementing an embodiment system and is not intended to be limiting.

Client computing devices 902, 904, 906, and/or 908 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. In some embodiments, the client computing devices can be special purpose computers that may be programmed or otherwise designed to perform a defined function via an embedded system, or the like, to perform the defined function independent of other tasks. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 902, 904, 906, and 908 may be any other electronic device, such as a thin-client computer, an Internet-enabled gaming system (e.g., a Microsoft Xbox gaming console with or without a Kinect® gesture input device), and/or a personal messaging device, capable of communicating over network(s) 910.

Although distributed system 900 is shown with four client computing devices, any number of client computing devices may be supported. Other devices, such as devices with sensors, etc., may interact with server 912.

Network(s) 910 in distributed system 900 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 910 can be a local area network (LAN), such as one based on Ethernet, Token-Ring and/or the like. Network(s) 910 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 912 may be composed of one or more general purpose computers, special purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 912 may be adapted to run one or more services or software applications described in the foregoing disclosure. For example, server 912 may correspond to a server for performing processing described above according to an embodiment of the present disclosure.

Server 912 may run an operating system including any of those discussed above, as well as any commercially available server operating system. Server 912 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Examples of database servers include without limitation those commercially available from Oracle, Microsoft, Sybase, IBM (International Business Machines), and the like.

In some implementations, server 912 may include one or more applications to analyze and consolidate data feeds and/or event updates received from users of client computing devices 902, 904, 906, and 908. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 912 may also include one or more applications to display the data feeds and/or real-time events via one or more display devices of client computing devices 902, 904, 906, and 908.

Distributed system 900 may also include one or more databases 914 and 916. Databases 914 and 916 may reside in a variety of locations. By way of example, one or more of databases 914 and 916 may reside on a non-transitory storage medium local to (and/or resident in) server 912. Alternatively, databases 914 and 916 may be remote from server 912 and in communication with server 912 via a network-based or dedicated connection. In one set of embodiments, databases 914 and 916 may reside in a storage-area network (SAN). Similarly, any necessary files for performing the functions attributed to server 912 may be stored locally on server 912 and/or remotely. In one set of embodiments, databases 914 and 916 may include relational databases, such as databases provided by Oracle, that are adapted to store, update, and retrieve data in response to SQL-formatted commands.

Figure 10:
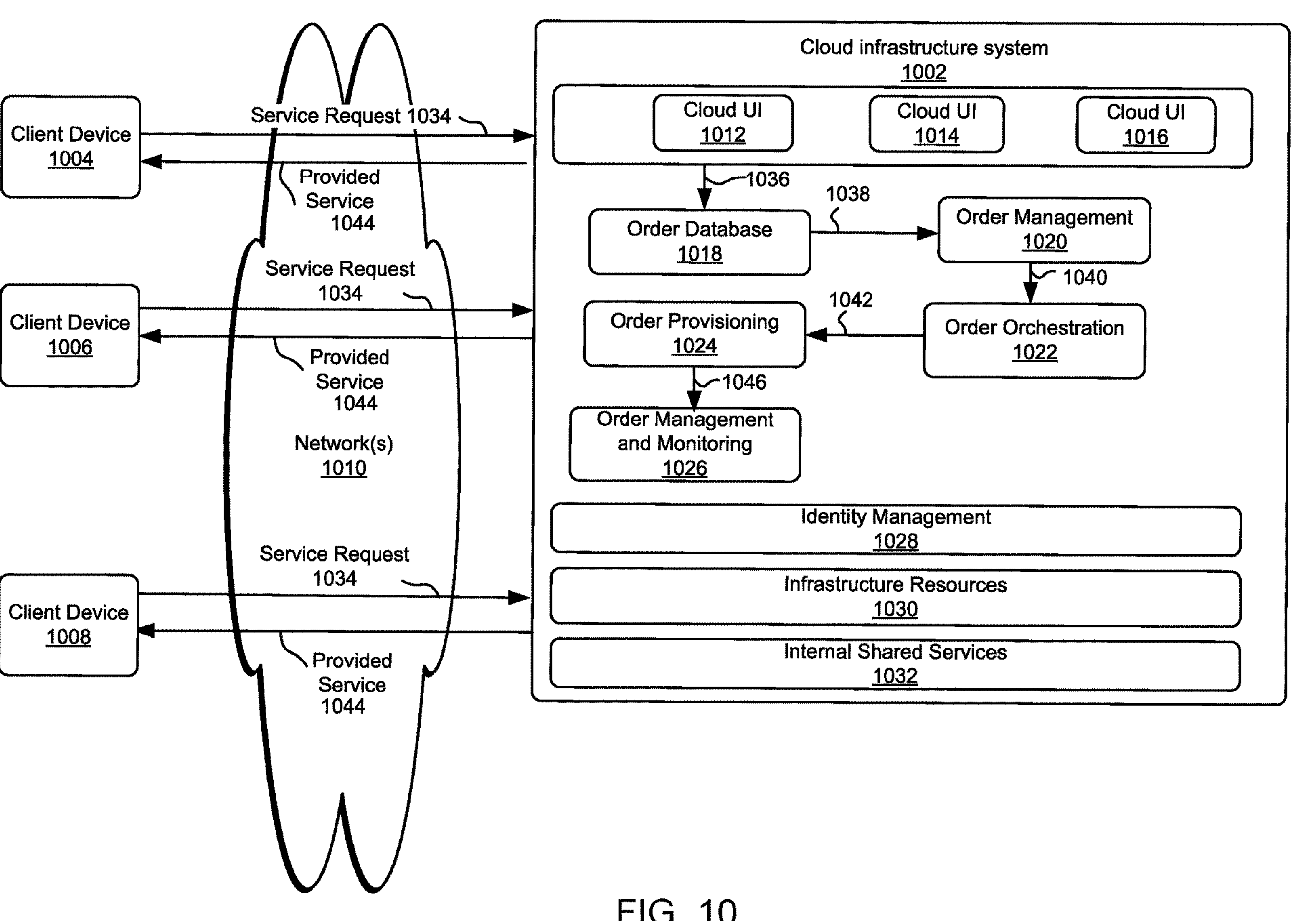
FIG. 10 is a simplified block diagram illustrating one or more components of a system environment according to an embodiment.

FIG. 10 is a simplified block diagram of one or more components of a system environment 1000 by which services provided by one or more components of an embodiment system may be offered as cloud services, in accordance with an embodiment of the present disclosure. In the illustrated embodiment, system environment 1000 includes one or more client computing devices 1004, 1006, and 1008 that may be used by users to interact with a cloud infrastructure system 1002 that provides cloud services. The client computing devices may be configured to operate a client application such as a web browser, a proprietary client application (e.g., Oracle Forms), or some other application, which may be used by a user of the client computing device to interact with cloud infrastructure system 1002 to use services provided by cloud infrastructure system 1002.

It should be appreciated that cloud infrastructure system 1002 depicted in the figure may have other components than those depicted. Further, the embodiment shown in the figure is only one example of a cloud infrastructure system that may incorporate an embodiment of the invention. In some other embodiments, cloud infrastructure system 1002 may have more or fewer components than shown in the figure, may combine two or more components, or may have a different configuration or arrangement of components.

Client computing devices 1004, 1006, and 1008 may be devices similar to those described above for 902, 904, 906, and 908.

Although system environment 1000 is shown with three client computing devices, any number of client computing devices may be supported. Other devices such as devices with sensors, etc. may interact with cloud infrastructure system 1002.

Network(s) 1010 may facilitate communications and exchange of data between clients 1004, 1006, and 1008 and cloud infrastructure system 1002. Each network may be any type of network familiar to those skilled in the art that can support data communications using any of a variety of commercially-available protocols, including those described above for network(s) 1010.

Cloud infrastructure system 1002 may comprise one or more computers and/or servers that may include those described above for server 912.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can be scaled based on the needs of its users. A specific instantiation of a service provided by cloud infrastructure system is referred to herein as a “service instance.” In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1002 may include a suite of applications, middleware, and database service offerings that are delivered to a customer in a self-service, subscription-based, reliable, highly available, and secure manner. The database service offerings may involve computing/storage resources being provisioned and configured for specialized use as needed, and the resources being un-provisioned in scenarios where the resources are not needed or not expected to be needed within a timeframe. An example of such a cloud infrastructure system is the Oracle Public Cloud provided by the present assignee.

In various embodiments, cloud infrastructure system 1002 may be adapted to automatically provision, manage and track a customer's subscription to services offered by cloud infrastructure system 1002. Cloud infrastructure system 1002 may provide the cloud services via different deployment models. For example, services may be provided under a public cloud model in which cloud infrastructure system 1002 is owned by an organization selling cloud services (e.g., owned by Oracle) and the services are made available to the general public or different industry enterprises. As another example, services may be provided under a private cloud model in which cloud infrastructure system 1002 is operated solely for a single organization and may provide services for one or more entities within the organization. The cloud services may also be provided under a community cloud model in which cloud infrastructure system 1002 and the services provided by cloud infrastructure system 1002 are shared by several organizations in a related community. The cloud services may also be provided under a hybrid cloud model, which is a combination of two or more different models.

In some embodiments, the services provided by cloud infrastructure system 1002 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1002. Cloud infrastructure system 1002 then performs processing to provide the services in the customer's subscription order.

In some embodiments, the services provided by cloud infrastructure system 1002 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and customizable services that can authenticate users and adapt to diverse needs of diverse organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various cloud applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1002 may also include infrastructure resources 1030 for providing the resources used to provide various services to customers of the cloud infrastructure system. In one embodiment, infrastructure resources 1030 may include pre-integrated and optimized combinations of hardware, such as servers, storage, and networking resources to execute the services provided by the PaaS platform and the SaaS platform.

In some embodiments, resources in cloud infrastructure system 1002 may be shared by multiple users, and the resources can be re-allocated based on demand. Additionally, resources may be allocated to users in different time zones. For example, cloud infrastructure system 1030 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1032 may be provided that are shared by different components or modules of cloud infrastructure system 1002 and by the services provided by cloud infrastructure system 1002. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1002 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1002, and the like.

In one embodiment, as depicted in the figure, cloud management functionality may be provided by one or more modules, such as an order management module 1020, an order orchestration module 1022, an order provisioning module 1024, an order management and monitoring module 1026, and an identity management module 1028. These modules may include or be provided using one or more computers and/or servers, which may be general purpose computers, special purpose computers, specialized server computers, server farms, server clusters, or any other appropriate arrangement and/or combination.

In operation 1034, a customer using a client device, such as client device 1004, 1006 or 1008, may interact with cloud infrastructure system 1002 by requesting one or more services provided by cloud infrastructure system 1002 and placing an order for a subscription for one or more services offered by cloud infrastructure system 1002. In certain embodiments, the customer may access a cloud User Interface (UI), cloud UI 1012, cloud UI 1014 and/or cloud UI 1016 and place a subscription order via these UIs. The order information received by cloud infrastructure system 1002 in response to the customer placing an order may include information identifying the customer and one or more services offered by the cloud infrastructure system 1002 that the customer intends to subscribe to.

After an order has been placed by the customer, the order information is received via the cloud UIs, 1012, 1014 and/or 1016.

At operation 1036, the order is stored in order database 1018. Order database 1018 can be one of several databases operated by cloud infrastructure system 1018 and operated in conjunction with other system elements.

At operation 1038, the order information is forwarded to an order management module 1020. In some instances, order management module 1020 may be configured to perform billing and accounting functions related to the order, such as verifying the order, and upon verification, booking the order.

At operation 1040, information regarding the order is communicated to an order orchestration module 1022. Order orchestration module 1022 may utilize the order information to orchestrate the provisioning of services and resources for the order placed by the customer. In some instances, order orchestration module 1022 may orchestrate the provisioning of resources to support the subscribed services using the services of order provisioning module 1024.

In certain embodiments, order orchestration module 1022 enables the management of processes associated with each order and applies logic to determine whether an order should proceed to provisioning. At operation 1042, upon receiving an order for a new subscription, order orchestration module 1022 sends a request to order provisioning module 1024 to allocate resources and configure those resources needed to fulfill the subscription order. Order provisioning module 1024 enables the allocation of resources for the services ordered by the customer. Order provisioning module 1024 provides a level of abstraction between the cloud services provided by cloud infrastructure system 1000 and the physical implementation layer that is used to provision the resources for providing the requested services. Order orchestration module 1022 may thus be isolated from implementation details, such as whether or not services and resources are actually provisioned on the fly or pre-provisioned and only allocated/assigned upon request.

At operation 1044, once the services and resources are provisioned, a notification of the provided service may be sent to customers on client devices 1004, 1006 and/or 1008 by order provisioning module 1024 of cloud infrastructure system 1002.

At operation 1046, the customer's subscription order may be managed and tracked by an order management and monitoring module 1026. In some instances, order management and monitoring module 1026 may be configured to collect usage statistics for the services in the subscription order, such as the amount of storage used, the amount data transferred, the number of users, and the amount of system up time and system down time.

In certain embodiments, cloud infrastructure system 1000 may include an identity management module 1028. Identity management module 1028 may be configured to provide identity services, such as access management and authorization services in cloud infrastructure system 1000. In some embodiments, identity management module 1028 may control information about customers who wish to utilize the services provided by cloud infrastructure system 1002. Such information can include information that authenticates the identities of such customers and information that describes which actions those customers are authorized to perform relative to various system resources (e.g., files, directories, applications, communication ports, memory segments, etc.) Identity management module 1028 may also include the management of descriptive information about each customer and about how and by whom that descriptive information can be accessed and modified.

Figure 11:
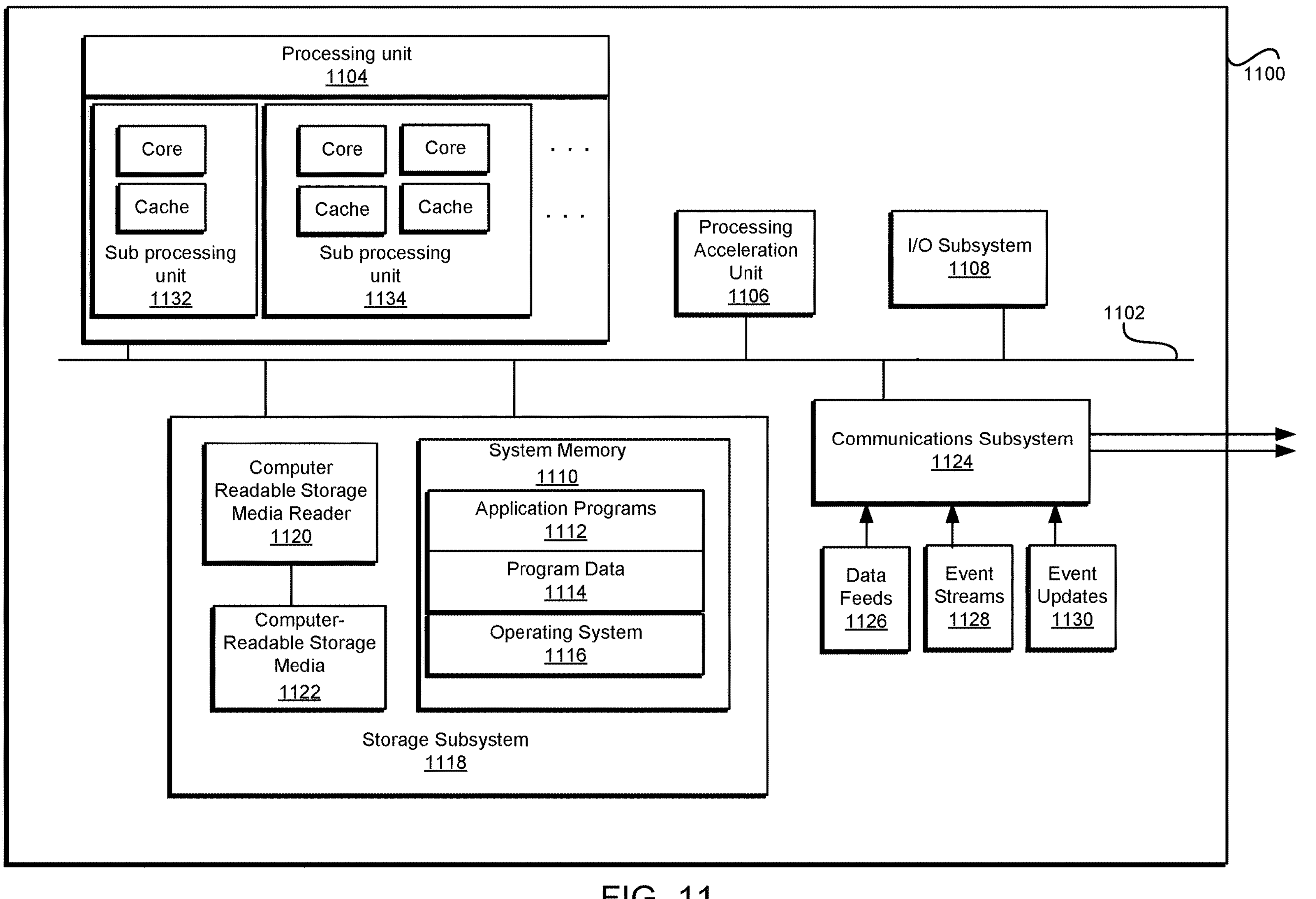
FIG. 11 illustrates an example of a computer system, in which various embodiments of the present invention may be implemented.

FIG. 11 illustrates an example of a computer system 1100, in which various embodiments of the present invention may be implemented. The system 1100 may be used to implement any of the computer systems described above. As shown in the figure, computer system 1100 includes a processing unit 1104 that communicates with a number of peripheral subsystems via a bus subsystem 1102. These peripheral subsystems may include a processing acceleration unit 1106, an I/O subsystem 1108, a storage subsystem 1118 and a communications subsystem 1124. Storage subsystem 1118 includes tangible computer-readable storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative embodiments of the bus subsystem may utilize multiple buses. Bus subsystem 1102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1104, which can be implemented as one or more integrated circuits (e.g., a conventional microprocessor or microcontroller), controls the operation of computer system 1100. One or more processors may be included in processing unit 1104. These processors may include single core or multicore processors. In certain embodiments, processing unit 1104 may be implemented as one or more independent processing units 1132 and/or 1134 with single or multicore processors included in each processing unit. In other embodiments, processing unit 1104 may also be implemented as a quad-core processing unit formed by integrating two dual-core processors into a single chip.

In various embodiments, processing unit 1104 can execute a variety of programs in response to program code and can maintain multiple concurrently executing programs or processes. At any given time, some or all of the program code to be executed can be resident in processor(s) 1104 and/or in storage subsystem 1118. Through suitable programming, processor(s) 1104 can provide various functionalities described above. Computer system 1100 may additionally include a processing acceleration unit 1106, which can include a digital signal processor (DSP), a special-purpose processor, and/or the like.

I/O subsystem 1108 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1100 may comprise a storage subsystem 1118 that comprises software elements, shown as being currently located within a system memory 1110. System memory 1110 may store program instructions that are loadable and executable on processing unit 1104, as well as data generated during the execution of these programs.

Depending on the configuration and type of computer system 1100, system memory 1110 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1104. In some implementations, system memory 1110 may include multiple different types of memory, such as static random access memory (SRAM) or dynamic random access memory (DRAM). In some implementations, a basic input/output system (BIOS), containing the basic routines that help to transfer information between elements within computer system 1100, such as during start-up, may typically be stored in the ROM. By way of example, and not limitation, system memory 1110 also illustrates application programs 1112, which may include client applications, Web browsers, mid-tier applications, relational database management systems (RDBMS), etc., program data 1114, and an operating system 1116. By way of example, operating system 1116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1118 may also provide a tangible computer-readable storage medium for storing the basic programming and data constructs that provide the functionality of some embodiments. Software (programs, code modules, instructions) that when executed by a processor provide the functionality described above may be stored in storage subsystem 1118. These software modules or instructions may be executed by processing unit 1104. Storage subsystem 1118 may also provide a repository for storing data used in accordance with the present invention.

Storage subsystem 1100 may also include a computer-readable storage media reader 1120 that can further be connected to computer-readable storage media 1122. Together and, optionally, in combination with system memory 1110, computer-readable storage media 1122 may comprehensively represent remote, local, fixed, and/or removable storage devices plus storage media for temporarily and/or more permanently containing, storing, transmitting, and retrieving computer-readable information.

Computer-readable storage media 1122 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1100.

By way of example, computer-readable storage media 1122 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 1122 may include, but is not limited to, Zip® drives, flash memory cards, universal serial bus (USB) flash drives, secure digital (SD) cards, DVD disks, digital video tape, and the like. Computer-readable storage media 1122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1100.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1100 to connect to one or more devices via the Internet. In some embodiments communications subsystem 1124 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 1202.11 family standards, or other mobile communication technologies, or any combination thereof), global positioning system (GPS) receiver components, and/or other components. In some embodiments communications subsystem 1124 can provide wired network connectivity (e.g., Ethernet) in addition to or instead of a wireless interface.

In some embodiments, communications subsystem 1124 may also receive input communication in the form of structured and/or unstructured data feeds 1126, event streams 1128, event updates 1130, and the like on behalf of one or more users who may use computer system 1100.

By way of example, communications subsystem 1124 may be configured to receive data feeds 1126 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1124 may also be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1124 may also be configured to output the structured and/or unstructured data feeds 1126, event streams 1128, event updates 1130, and the like to one or more databases that may be in communication with one or more streaming data source computers coupled to computer system 1100.

Computer system 1100 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1100 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method comprising:

receiving, by a computing device, natural language input representing a request by an entity to create a rule characterized by a rule type, the rule type including one or more conditions and one or more actions based on the one or more conditions;

tokenizing, by the computing device, the natural language input to generate a set of tokens that represents the natural language input;

mapping, by the computing device and using a trained graph-based machine-learning model, a first subset of the tokens to a first condition of the one or more conditions and a second subset of the tokens to a second condition of the one or more conditions;

generating, by the computing device, a graph representation of the natural language input, the graph representation including one or more nodes corresponding to the first subset of the tokens and one or more attributes, each attribute of the one or more attributes including a different token of the second subset of the tokens;

training, by the computing device, the graph-based machine-learning model using at least (a) a set of custom schema corresponding to tenant-specific data, wherein each custom schema included in the set of custom schema is different and associated with a different tenant, and (b) tenant-ambiguous data;

generating a tenant-specific graph of a set of tenant-specific graphs that uses at least part of the set of custom schema and at least part of the tenant-ambiguous data;

determining, by the computing device, the tenant-specific graph of the set of tenant-specific graphs corresponds to the graph representation of the natural language input, wherein the set of tenant-specific graphs is generated by the trained graph-based machine-learning model;

generating, by the computing device, the rule by adjusting a template of the rule type using nodes of the tenant-specific graph and attributes of the tenant-specific graph;

causing display, by the computing device, of information indicating at least the first condition and the second condition of the rule; and wherein the rule as generated, when evaluated by one or more computing devices and the first condition and the second condition are determined to be satisfied, causes the one or more computing devices to execute an action defined by the rule.

2. The computer-implemented method of claim 1, wherein the trained graph-based machine-learning model includes a graph neural network-BERT (GNN-BERT) model, a graph convolutional network (GCN), a gated-graph convolutional network (G-GCN), or a graph isomorphism network (GIN).

3. The computer-implemented method of claim 1, wherein each tenant-specific graph of the set of tenant-specific graphs corresponds to a different custom schema of the set of custom schema, and wherein the tenant-specific graph is included in the set of tenant-specific graphs.

4. The computer-implemented method of claim 1, wherein:

receiving the natural language input comprises receiving, by the computing device, the natural language input via a user interface provided by a user interface layer that is communicatively coupled to an application programming interface layer;

generating the rule comprises generating, by the computing device, the rule using a machine-learning layer that is communicatively coupled to the application programming interface layer;

the application programming interface layer is configured to transmit the natural language input from the user interface layer to the machine-learning layer and to transmit the rule from the machine-learning layer to the user interface layer;

training the graph-based machine-learning model comprises training, by the computing device, the graph-based machine-learning model using a pre-training layer that is communicatively coupled to the machine-learning layer; and the pre-training layer is configured to provide the machine-learning layer with access to each graph of the set of tenant-specific graphs.

5. The computer-implemented method of claim 1, wherein providing the rule to the entity comprises providing, by the computing device and via a user interface, the rule in an entity-readable format with one or more adjustable fields that, when adjusted, cause the rule to be edited.

6. The computer-implemented method of claim 5, further comprising:

receiving, by the computing device and via the user interface, input indicating an adjustment to the rule; and retraining, by the computing device, the trained graph-based machine-learning model using the adjustment to the rule.

7. The computer-implemented method of claim 6, wherein retraining the trained graph-based machine-learning model comprises:

identifying, by the computing device, the adjustment to the rule by comparing the rule to an adjusted rule received by the computing device;

generating, by the computing device, a tokenized adjustment based on the adjustment to the rule; and retraining, by the computing device and using the tokenized adjustment, the trained graph-based machine-learning model.

8. A non-transitory machine-readable storage medium comprising a computer-program product that includes instructions configured to cause a data processing apparatus to perform operations comprising:

receiving, by a computing device, natural language input representing a request by an entity to create a rule characterized by a rule type, the rule type including one or more conditions and one or more actions based on the one or more conditions;

tokenizing, by the computing device, the natural language input to generate a set of tokens that represents the natural language input;

mapping, by the computing device and using a trained graph-based machine-learning model, a first subset of the tokens to a first condition of the one or more conditions and a second subset of the tokens to a second condition of the one or more conditions;

generating, by the computing device, a graph representation of the natural language input, the graph representation including one or more nodes corresponding to the first subset of the tokens and one or more attributes, each attribute of the one or more attributes including a different token of the second subset of the tokens;

training, by the computing device, the graph-based machine-learning model using at least (a) a set of custom schema corresponding to tenant-specific data, wherein each custom schema included in the set of custom schema is different and associated with a different tenant, and (b) tenant-ambiguous data;

generating a tenant-specific graph of a set of tenant-specific graphs that uses at least part of the set of custom schema and at least part of the tenant-ambiguous data;

determining, by the computing device, the tenant-specific graph of the set of tenant-specific graphs corresponds to the graph representation of the natural language input, wherein the set of tenant-specific graphs is generated by the trained graph-based machine-learning model;

generating, by the computing device, the rule by adjusting a template of the rule type using nodes of the tenant-specific graph and attributes of the tenant-specific graph;

causing display, by the computing device, of information indicating at least the first condition and the second condition of the rule; and wherein the rule as generated, when evaluated by one or more computing devices and the first condition and the second condition are determined to be satisfied, causes the one or more computing devices to execute an action defined by the rule.

9. The non-transitory machine-readable storage medium of claim 8, wherein the trained graph-based machine-learning model includes a graph neural network-BERT (GNN-BERT) model, a graph convolutional network (GCN), a gated-graph convolutional network (G-GCN), or a graph isomorphism network (GIN).

10. The non-transitory machine-readable storage medium of claim 8, wherein each tenant-specific graph of the set of tenant-specific graphs corresponds to a different custom schema of the set of custom schema, and wherein the tenant-specific graph is included in the set of tenant-specific graphs.

11. The non-transitory machine-readable storage medium of claim 8, wherein:

receiving the natural language input comprises receiving the natural language input via a user interface provided by a user interface layer that is communicatively coupled to an application programming interface layer;

generating the rule comprises generating the rule using a machine-learning layer that is communicatively coupled to the application programming interface layer;

the application programming interface layer is configured to transmit the natural language input from the user interface layer to the machine-learning layer and to transmit the rule from the machine-learning layer to the user interface layer;

training the graph-based machine-learning model comprises training the graph-based machine-learning model using a pre-training layer that is communicatively coupled to the machine-learning layer; and the pre-training layer is configured to provide the machine-learning layer with access to each graph of the set of tenant-specific graphs.

12. The non-transitory machine-readable storage medium of claim 8, wherein providing the rule to the entity comprises providing, via a user interface, the rule in an entity-readable format with one or more adjustable fields that facilitate manual editing of the rule.

13. The non-transitory machine-readable storage medium of claim 12, wherein the operations further comprise:

receiving, via the user interface, input indicating an adjustment to the rule; and retraining the trained graph-based machine-learning model using the adjustment to the rule.

14. The non-transitory machine-readable storage medium of claim 13, wherein the operation of retraining the trained graph-based machine-learning model comprises:

identifying the adjustment to the rule by comparing the rule to a received, adjusted rule;

generating a tokenized adjustment based on the adjustment to the rule; and retraining, using the tokenized adjustment, the trained graph-based machine-learning model.

15. A system, comprising:

one or more data processors; and a non-transitory computer-readable storage medium containing instructions which, when executed on the one or more data processors, cause the one or more data processors to perform operations comprising:

receiving, by a computing device, natural language input representing a request by an entity to create a rule characterized by a rule type, the rule type including one or more conditions and one or more actions based on the one or more conditions;

tokenizing, by the computing device, the natural language input to generate a set of tokens that represents the natural language input;

mapping, by the computing device and using a trained graph-based machine-learning model, a first subset of the tokens to a first condition of the one or more conditions and a second subset of the tokens to a second condition of the one or more conditions;

generating, by the computing device, a graph representation of the natural language input, the graph representation including one or more nodes corresponding to the first subset of the tokens and one or more attributes, each attribute of the one or more attributes including a different token of the second subset of the tokens;

training, by the computing device, the graph-based machine-learning model using at least (a) a set of custom schema corresponding to tenant-specific data, wherein each custom schema included in the set of custom schema is different and associated with a different tenant, and (b) tenant-ambiguous data;

generating a tenant-specific graph of a set of tenant-specific graphs that uses at least part of the set of custom schema and at least part of the tenant-ambiguous data;

determining, by the computing device, the tenant-specific graph of the set of tenant-specific graphs corresponds to the graph representation of the natural language input, wherein the set of tenant-specific graphs is generated by the trained graph-based machine-learning model;

generating, by the computing device, the rule by adjusting a template of the rule type using nodes of the tenant-specific graph and attributes of the tenant-specific graph;

causing display, by the computing device, of information indicating at least the first condition and the second condition of the rule; and wherein the rule as generated, when evaluated by one or more computing devices and the first condition and the second condition are determined to be satisfied, causes the one or more computing devices to execute an action defined by the rule.

16. The system of claim 15, wherein the trained graph-based machine-learning model includes a graph neural network-BERT (GNN-BERT) model, a graph convolutional network (GCN), a gated-graph convolutional network (G-GCN), or a graph isomorphism network (GIN).

17. The system of claim 15, wherein:

each tenant-specific graph of the set of tenant-specific graphs corresponds to a different custom schema of the set of custom schema;

the tenant-specific graph is included in the set of tenant-specific graphs;

receiving the natural language input comprises receiving the natural language input via a user interface provided by a user interface layer that is communicatively coupled to an application programming interface layer;

generating the rule comprises generating the rule using a machine-learning layer that is communicatively coupled to the application programming interface layer;

the application programming interface layer is configured to transmit the natural language input from the user interface layer to the machine-learning layer and to transmit the rule from the machine-learning layer to the user interface layer;

training the graph-based machine-learning model comprises training the graph-based machine-learning model using a pre-training layer that is communicatively coupled to the machine-learning layer; and the pre-training layer is configured to provide the machine-learning layer with access to each graph of the set of tenant-specific graphs.

18. The system of claim 15, wherein providing the rule to the entity comprises providing, and via a user interface, the rule in an entity-readable format with one or more adjustable fields that, when adjusted, cause the rule to be edited.

19. The system of claim 18, wherein the operations further comprise:

receiving, via the user interface, input indicating an adjustment to the rule; and retraining the trained graph-based machine-learning model using the adjustment to the rule.

20. The system of claim 19, wherein the operation of retraining the trained graph-based machine-learning model comprises:

identifying the adjustment to the rule by comparing the rule to a received, adjusted rule;

generating a tokenized adjustment based on the adjustment to the rule; and retraining, using the tokenized adjustment, the trained graph-based machine-learning model.

21. The computer-implemented method of claim 1, wherein the first subset of the tokens includes a first token that specifies the first condition and one or more other tokens and the second subset of the tokens includes a second token that specifies the second condition and the one or more other tokens.

22. The non-transitory machine-readable storage medium of claim 8, wherein the first subset of the tokens includes a first token that specifies the first condition and one or more other tokens and the second subset of the tokens includes a second token that specifies the second condition and the one or more other tokens.

23. The system of claim 15, wherein the first subset of the tokens includes a first token that specifies the first condition and one or more other tokens and the second subset of the tokens includes a second token that specifies the second condition and the one or more other tokens.

* * * * *